(12) United States Patent
Veto et al.

(10) Patent No.: US 10,184,579 B2
(45) Date of Patent: *Jan. 22, 2019

(54) STACKED DISK CHECK VALVE

(71) Applicant: The Boeing Company, Chicago, IL (US)

(72) Inventors: Christopher C. Veto, Huntington Beach, CA (US); Gary D. Grayson, Issaquah, WA (US); Victor J. Barackman, Costa Mesa, CA (US)

(73) Assignee: THE BOEING COMPANY, Chicago, IL (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/228,741

(22) Filed: Aug. 4, 2016

(65) Prior Publication Data

US 2018/0038498 A1 Feb. 8, 2018

(51) Int. Cl.
*F16K 15/14* (2006.01)
*F16K 1/44* (2006.01)

(52) U.S. Cl.
CPC ............ *F16K 15/148* (2013.01); *F16K 1/443* (2013.01); *Y10T 137/7832* (2015.04); *Y10T 137/7842* (2015.04); *Y10T 137/7879* (2015.04)

(58) Field of Classification Search
CPC ......... Y10T 137/7838; Y10T 137/7842; Y10T 137/7845; Y10T 137/7846; Y10T 137/7878; Y10T 137/789

See application file for complete search history.

(56) References Cited

U.S. PATENT DOCUMENTS

| | | | | |
|---|---|---|---|---|
| 82,670 | A * | 9/1868 | Wilson et al. | F16K 15/038 137/512.1 |
| 2,270,469 | A * | 1/1942 | Osborn, Jr. | F16K 17/196 137/526 |
| 4,550,749 | A * | 11/1985 | Krikorian | F16K 15/148 137/843 |
| 5,277,171 | A * | 1/1994 | Lannes | F16K 15/148 122/14.31 |
| 2004/0244840 | A1* | 12/2004 | Takeda | F16K 15/063 137/512 |

OTHER PUBLICATIONS

Barret et al, 'Space Shuttle "Simplified LO2 Check Valve Development Tests," Journal of Propulsion and Power, vol. 11, No. 2, Mar.-Apr. 1995 (6 pages).

(Continued)

*Primary Examiner* — R. K. Arundale
(74) *Attorney, Agent, or Firm* — Hanley, Flight & Zimmerman, LLC

(57) ABSTRACT

Fluid apparatus and related methods are disclosed. An example fluid apparatus includes a valve body defining a fluid flow passageway and a plurality of valve seats. A flow control member is positioned in the fluid flow passageway of the valve body. The flow control member having a plurality of disks. A respective one of the disks moves relative to a respective one of the valve seats to control fluid flow through the valve body. The flow control member is adjustable relative to a longitudinal axis of the valve body to provide a preload to the disks. Each of the disks has a cracking pressure corresponding to the preload.

19 Claims, 20 Drawing Sheets

(56) References Cited

OTHER PUBLICATIONS

Proctor et al., "Brush Seals for Cryogenic Applications: Performance, Stage Effects, and Preliminary Wear Results in LN2 and LH2," NASA Technical Paper 3536, 1996 (78 pages).

Martinez et al., "Lessons Learned from the Design, Certification, and Operation of the Space Shuttle Integrated Main Propulsion System (IMPS)," American Institute of Aeronautics and Astronautics, 2011 (23 pages).

Crane, "Flow of Fluids Through Valves, Fittings, and Pipe," Crane Co, Technical Paper No. 410, 1988 Chapter 2, pp. 2-1 to 2-18; A-20 (19 pages).

Murdock, Mechanics of Fluids, Marks, Standard Handbook for Mechanical Engineers, 8th ed., edited by T. Baumeister, McGraw-Hill, New York, 1978, pp. 6-76; 6-77; 6-86; 6-87.

\* cited by examiner

STACKED DISK CHECK VALVE

GOVERNMENT CONTRACT

This invention was made with government support under HR0011-14-9-0005. The government has certain rights in the invention.

FIELD OF THE DISCLOSURE

This patent relates generally to fluid devices and, more particularly, to valve apparatus and related methods.

BACKGROUND

Fluid systems (e.g., fuel systems, propulsion systems, hydraulic systems, etc.) often employ fluid devices (e.g., check valves) to prevent reverse fluid flow through the system. For example, a space shuttle propulsion system may employ check valves to prevent reverse fluid flow to a main engine of a space shuttle. Check valves typically include a ball valve that moves relative to a valve seat to control fluid flow through the check valve. In some examples, a spring is often employed to bias the ball valve into sealing engagement with the valve seat. In some examples, the spring may be adjustable to vary a preload to adjust or set a desired cracking pressure of the valve (i.e., a pressure at which the ball valve moves to an open position away from the valve seat to allow fluid through the valve). However, in some instances, the spring may wear or fracture due to cyclic fatigue or cryogenic shock. As a result, the valve may open at a pressure less than the desired cracking pressure provided by the initial preload or, alternatively, there may be reverse flow (fluid flow from the outlet toward the inlet). In some instances, a change in pressure across an orifice of the fluid valve may produce vibration having a frequency similar or the same as a resonant frequency of the spring, which causes chattering. In some instances, for example during high vibrational applications, the ball valve may dislodge (e.g., from the impetus of the spring) and fall from the valve seat.

Some known check valves employ a spring-biased swing flapper. However, in some applications, fluid flow may cause cyclic wear on the spring and/or flapper due to spring-flapper oscillations. In some examples, springless or spring-free check valves employ a flap that moves or deflects relative to a valve seat to control fluid flow. However, a cracking pressure of springless check valves may not be adjustable. In some instances, the flaps could chatter and/or become damaged during high vibrational applications. Thus, the flap may be subject to chatter during certain flow conditions that prevent the flap from providing a desired shut-off or seal.

SUMMARY

An example fluid apparatus disclosed herein includes a valve body defining a fluid flow passageway and a plurality of valve seats. A flow control member is positioned in the fluid flow passageway of the valve body. The flow control member having a plurality of disks. A respective one of the disks moves relative to a respective one of the valve seats to control fluid flow through the valve body. The flow control member is adjustable relative to a longitudinal axis of the valve body to provide a preload to the disks. Each of the disks has a cracking pressure corresponding to the preload.

Another example apparatus includes a valve body defining a valve seat positioned in a fluid flow passageway between an inlet and an outlet and a threaded inner wall and a flow control member positionable in the fluid flow passageway. The flow control member including: a body; a disk coupled to the body, where the disk is to seal against the valve seat to prevent fluid flow through the fluid flow passageway when a pressure at an inlet of the valve body is less than a cracking pressure of the disk and the disk is to move away from the valve seat to allow fluid flow through the fluid flow passageway when the pressure at the inlet of the housing is greater than or equal to the cracking pressure; and a head having threaded portion to engage the threaded inner wall of the valve body to couple the flow control member to the valve body, where the head is adjustable relative to a longitudinal axis of the valve body to provide a preload to the disk corresponding to the cracking pressure.

An example method disclosed herein includes positioning a flow control member in a first housing of a fluid valve, where the first housing has a plurality of valve seats and the flow control member has a plurality of disks. The valve seats and the disks are spaced along a longitudinal axis of the first housing such that a respective one of the disks is to engage a respective one of the valve seats when the flow control member is positioned in the first housing. The method includes adjusting a position of the flow control member relative to the longitudinal axis to vary a preload of the plurality of disks.

Figure 1:
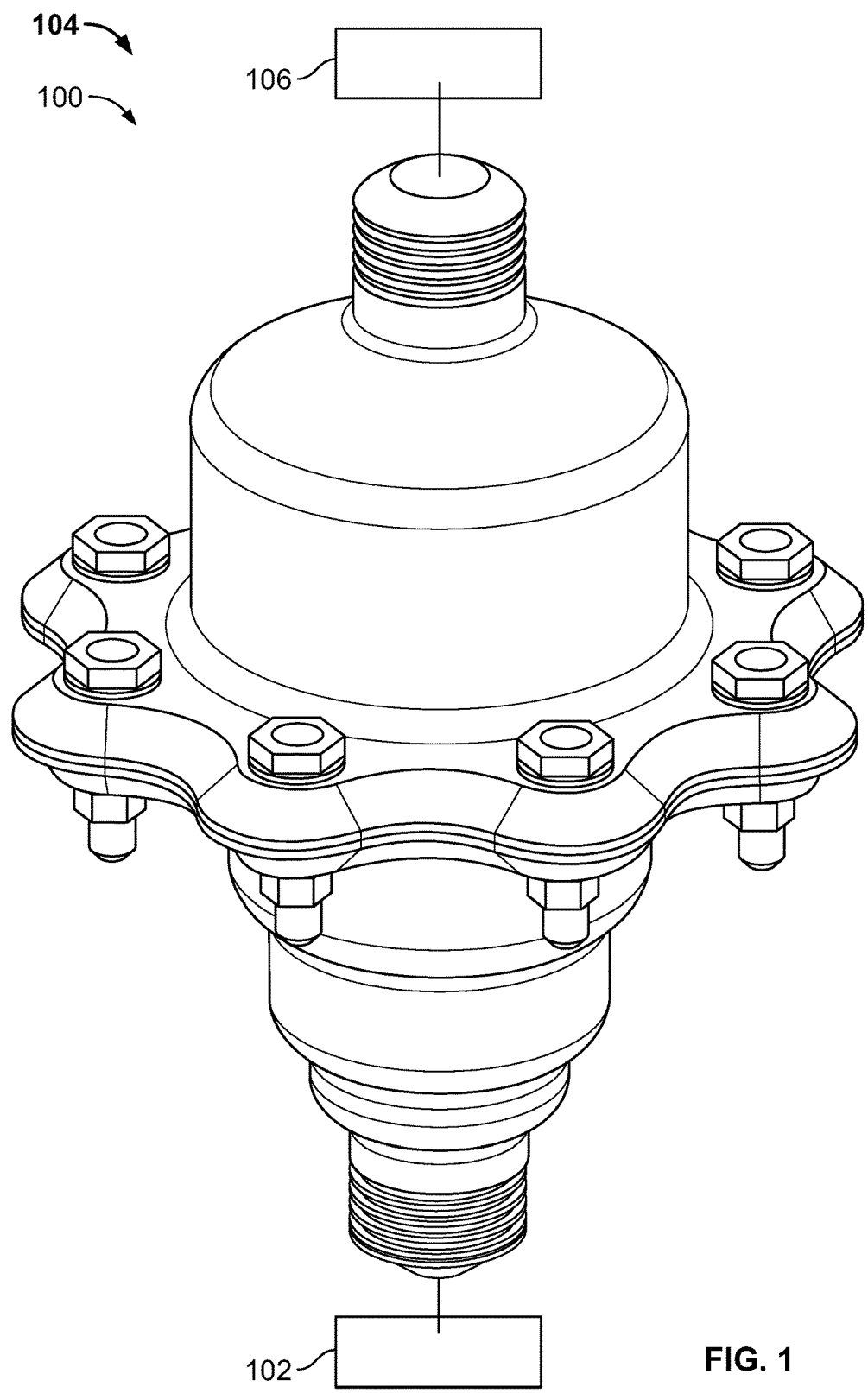
FIG. 1 is a perspective view of an example fluid apparatus constructed in accordance with the teachings disclosed herein.

Wherever possible, the same reference numbers will be used throughout the drawing(s) and accompanying written description to refer to the same or like parts. As used in this description, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in direct contact with another part means that there is no intermediate part between the two parts. As used herein, substantially and approximately mean within about 10% different than the number at issue. For example, substantially perpendicular means 90 degrees plus or minus 10%. For example, approximately 90 degrees means 90 degrees plus or minus 10% (e.g., between about 81 degrees and 99 degrees). In some examples, substantially parallel means 0 degrees plus or minus 10 degrees.

DETAILED DESCRIPTION

The example fluid apparatus disclosed herein may be employed with control systems to control the flow of fluids. In some examples, the example fluid apparatus disclosed herein may be configured as check valves that prevent reverse fluid flow through a fluid control system (e.g., a fuel system, a hydraulic system, etc.). The example fluid apparatus disclosed herein may be employed aerospace applications or systems (e.g., a spacecraft, an aircraft, a space station system), automotive applications or systems, industrial systems, applications having cryogenic conditions, and/or any other application or system requiring fluid flow control (e.g., prevention of reverse fluid flow). For example, the example fluid apparatus disclosed herein may be employed in propulsion systems (e.g., a rocket or spacecraft propulsion system), fuel systems (e.g., an automotive fuel system), hydraulic systems, and/or any other process or system requiring fluid flow control (e.g., prevention of reverse fluid flow).

The example fluid apparatus disclosed herein reduce weight and/or manufacturing costs compared to conventional check valves (e.g., a ball check valve, a swing valve, a diaphragm check valve, etc.). Additionally, the example fluid apparatus disclosed herein may provide improved sealing compared to conventional fluid valves (e.g., check valves). In some examples, the fluid apparatus disclosed herein may provide redundant sealing. For example, the example fluid apparatus disclosed herein may employ multiple flow control members (e.g., multiple stacked disks) and/or valve seats to provide redundant sealing. In some examples, the fluid apparatus disclosed herein may include only one disk and/or only one valve seat.

In some examples, the fluid apparatus disclosed herein enable preload or cracking pressure tuning or adjustment without use of a spring. For example, a cracking pressure or pressure required to open the example fluid apparatus may be adjusted or varied to a desired pressure without requiring use of a biasing element or spring. For example, to adjust a cracking pressure or preload of the valve, an example flow control member disclosed herein includes a threaded portion to engage a threaded wall of a housing to enable (e.g., linear) adjustment of the flow control member along the longitudinal axis. In some examples, a passageway and/or a rib of the example fluid flow control members disclosed herein may include a profile (e.g., an airfoil profile and/or a tapered profile) to promote laminar flow characteristics and/or prevent turbulent fluid flow characteristics when fluid flows through the fluid apparatus. In some examples, the fluid apparatus disclosed herein may be conducive to cryogenic environments or conditions and/or are resistant to vibration loading. In some examples, the fluid apparatus disclosed herein may be composed of any material(s) or alloys such as, for example, Inconel, steel, aluminum, plastic, PTFE, Teflon, and/or any other material(s). In some examples, the material of the flow control member may provide different cracking pressures based on a temperature of a process fluid and/or a temperature of an environment of the valve. In some examples, the example fluid apparatus disclosed herein may be manufactured using an additive manufacturing process (e.g., a direct metal laser sintering additive manufacturing process injection molding, machining and/or any other manufacturing process(es). In some examples, the fluid apparatus disclosed herein employ a plurality of disks. In some examples, the disks are spaced along a longitudinal axis of a flow control member. In some examples, the disks are concentric.

FIG. 1 illustrates an example fluid apparatus 100 in accordance with the teachings of this disclosure. The example fluid apparatus 100 of the illustrated example is a check valve that enables one-way fluid flow from an upstream source 102 of a system 104 toward a downstream source 106 of the system 104. In addition, the example fluid apparatus 100 of the illustrated example prevents fluid flow from the downstream source 106 toward the upstream source 102. In some examples, the system 104 may be a portion of a space shuttle main propulsion system and/or another re-entry vehicle. For example, the upstream source 102, the fluid apparatus 100 and the downstream source 106 may be part of a bleed return line of a spacecraft propulsion system.

Figure 2:
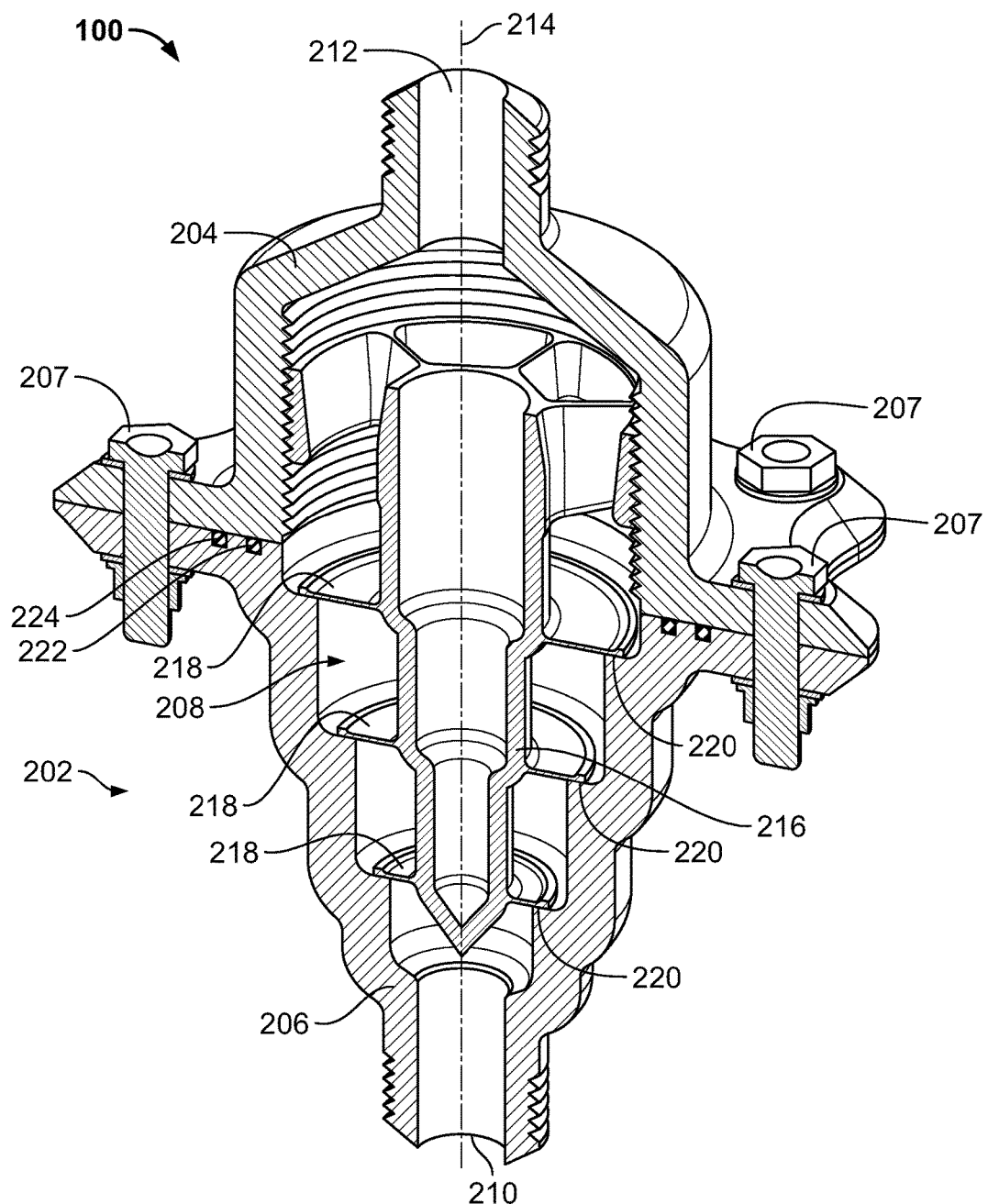
FIG. 2 is a cross-sectional view of the fluid apparatus of FIG. 1.

FIG. 2 is a cross-sectional, perspective view of the example fluid apparatus 100 of FIG. 1. The example fluid apparatus of the illustrated example includes a housing 202 having a first housing portion 204 (e.g., a bonnet) coupled to a second housing portion 206 (e.g., a valve body). The first housing portion 204 and the second housing portion 206 of the illustrated example (e.g., when coupled together via, for example, fasteners 207) define a fluid flow passageway 208 (e.g., an axial fluid flow path) between an inlet 210 and an outlet 212. The inlet 210 of the illustrated example is coaxially aligned with the outlet 212. Additionally, the inlet 210 and the outlet 212 of the illustrated example are coaxially aligned relative to a longitudinal axis 214 of the fluid apparatus 100 and/or the fluid flow passageway 208. In some examples, the inlet 210 may not be coaxially aligned with the outlet 212 and/or the longitudinal axis 214.

To control fluid flow between the inlet 210 and the outlet 212 the example fluid apparatus 100 includes a flow control member 216 (e.g., a poppet) positioned in the fluid flow passageway 208. In the illustrated example, the flow control member 216 includes radial flanges or disks 218 (e.g., multiple stacked disks). In particular, the disks 218 of the example flow control member 216 are spaced along a length of the flow control member 216 (e.g., concentrically aligned). The disks 218 of the example flow control member 216 move relative to (e.g., engage and disengage) respective valve seats 220 of the fluid apparatus 100 to control (e.g., prevent or allow) fluid flow through the fluid flow passageway 208. As described in greater detail below, the example disks 218 provide redundant sealing. In addition, the example flow control member 216 of the illustrated example provides a preload to the disks 218 without use of a biasing element such as, for example, a spring. Seals 222 and 224 between the first housing portion 204 and the second housing portion 206 prevent fluid flow leakage external of the housing 202 when fluid flows between the inlet 210 and the outlet 212.

Figure 3:
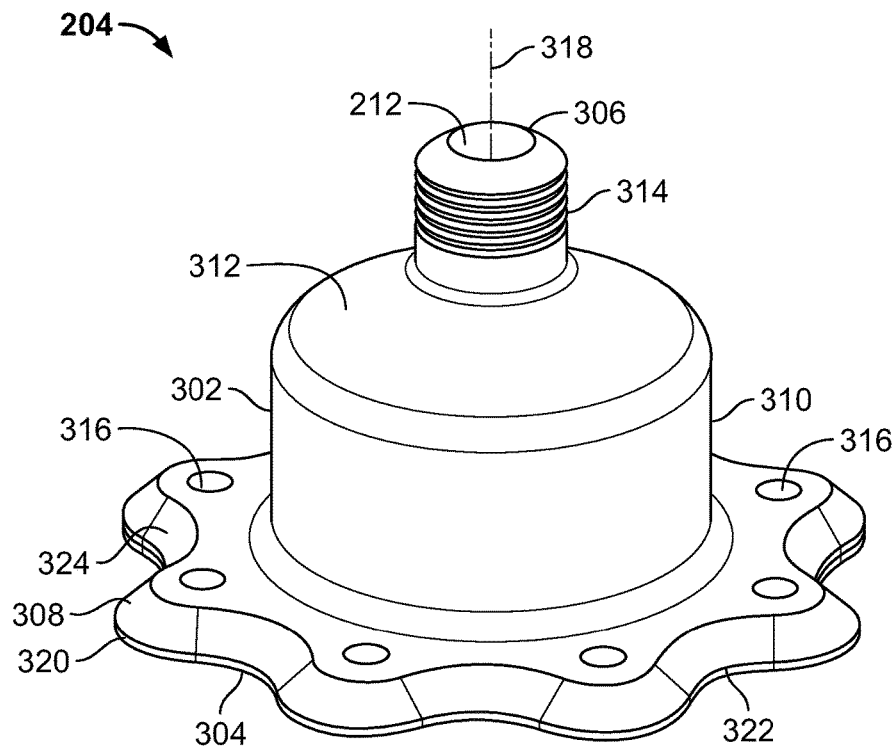
FIG. 3 is a perspective view of an example first housing of the example fluid apparatus of FIGS. 1-2.

FIG. 3 is a perspective view of the first housing portion 204 of FIGS. 1 and 2. The first housing portion 204 of the illustrated example includes a body 302 having a first end 304 and a second end 306 opposite the first end 304. The body 302 of the illustrated example includes a flange 308 adjacent the first end 304 and the outlet 212 adjacent the second end 306. The body 302 of the illustrated example includes a cylindrical portion 310 extending from the flange 308 and a tapered portion 312 extending between the cylindrical portion 310 and the outlet 212. To couple the downstream source 106 (FIG. 1) to the fluid apparatus 100, the body 302 of the illustrated example includes a fitting 314. In the illustrated example, the fitting 314 is integrally formed with the body 302 and extends from the tapered portion 312. The fitting 314 of the illustrated example is a threaded male fitting. In some examples, the fitting 314 may be a threaded female fitting, a barb, a quick disconnect fitting, a swage lock, a flange, and/or any other fitting(s). The flange 308 of the illustrated example includes holes 316 radially spaced relative to a longitudinal axis 318 of the body 302. To reduce mass, material cost, manufacturing time, etc., a peripheral edge 320 of the flange 308 of the illustrated example includes a sinusoidal shape or profile 322 and a chamfer 324 (e.g., a 45 degree angle). In some examples, the peripheral edge 320 of the flange 308 may include a circular shape or any other shape and/or may not include the chamfer 324.

Figure 4:
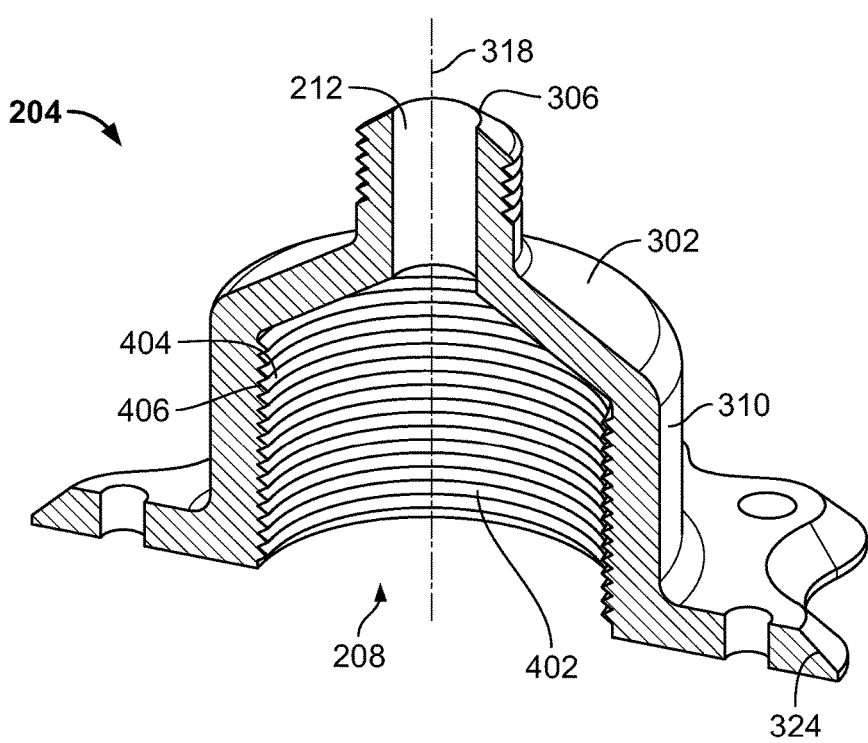
FIG. 4 is a perspective, cross-sectional view of the example first housing of FIG. 3.

FIG. 4 illustrates a cross-sectional, perspective view of the first housing portion 204 of FIG. 3. The body 302 of the first housing portion 204 has a cavity 402 to form a portion of the fluid flow passageway 208 of the fluid apparatus 100. In the illustrated example, at least a portion of an inner surface 404 of the cylindrical portion 310 includes threads 406. As described in greater detail below, the threads 406 of the body 302 couple the flow control member 216 to the fluid apparatus 100.

Figure 5:
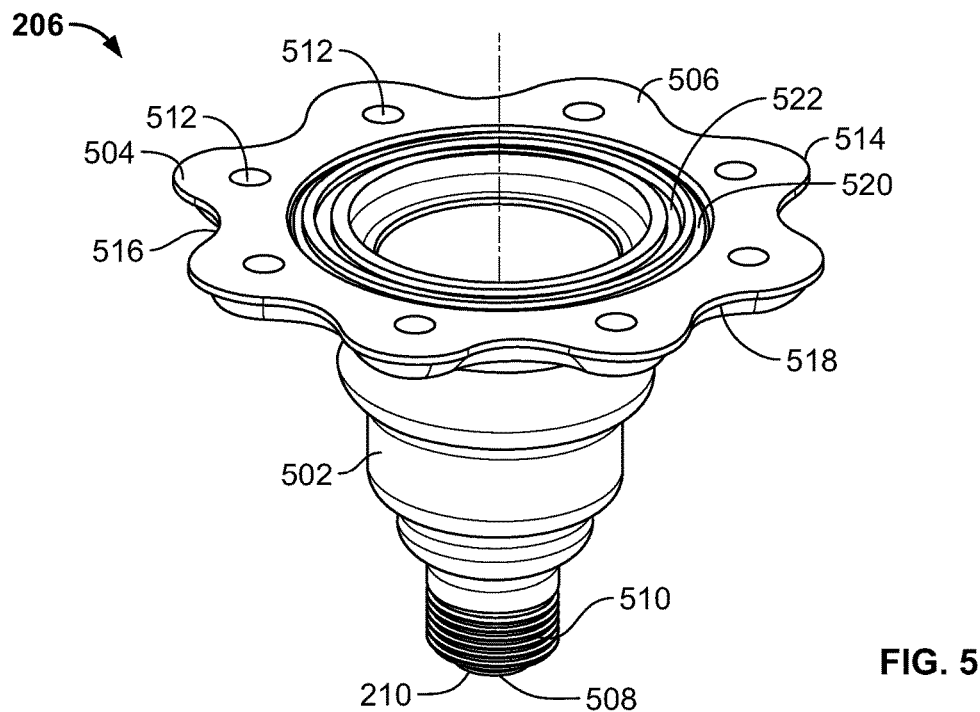
FIG. 5 is a perspective view of an example second housing of the example fluid apparatus of FIGS. 1-2.

FIG. 5 is a perspective view of the example second housing portion 206 of FIGS. 1 and 2. The second housing portion 206 includes a body 502 (e.g., a cylindrical body) and a flange 504. The flange 504 is adjacent a first end 506 of the body 502 (e.g., a cylindrical body) and a second end 508 of the body 502 opposite the first end 506 defines the inlet 210. To couple the fluid apparatus 100 to the upstream source 102 of FIG. 1, the second housing portion 206 of the illustrated example includes a fitting 510 adjacent the inlet 210. The fitting 510 of the illustrated example is integrally formed with the body 502 and is a threaded male fitting. In some examples, the fitting 510 may be a threaded female fitting, a barb, a quick disconnect fitting, a swage lock, a flange, and/or any other fitting(s). The flange 504 of the illustrated example includes holes 512. To reduce mass, material cost, manufacturing time, etc., a peripheral edge 514 of the flange 504 of the illustrated example includes a sinusoidal shape or profile 516 and a chamfer 518 (e.g., a 45-degree angle). In some examples, the peripheral edge 514 may include a circular shape and/or may not include the chamfer 518. To provide a seat for the seals 222 and 224 (e.g., O-rings), the body 502 of the illustrated example includes a first groove 520 (e.g., an annular groove) and a second groove 522 (e.g., an annular groove). Each of the grooves 520 and 522 of the illustrated example includes a U-shaped channel. In some examples, the first groove 520 and/or the second groove 522 may have V-shaped channel or profile.

Figure 6:
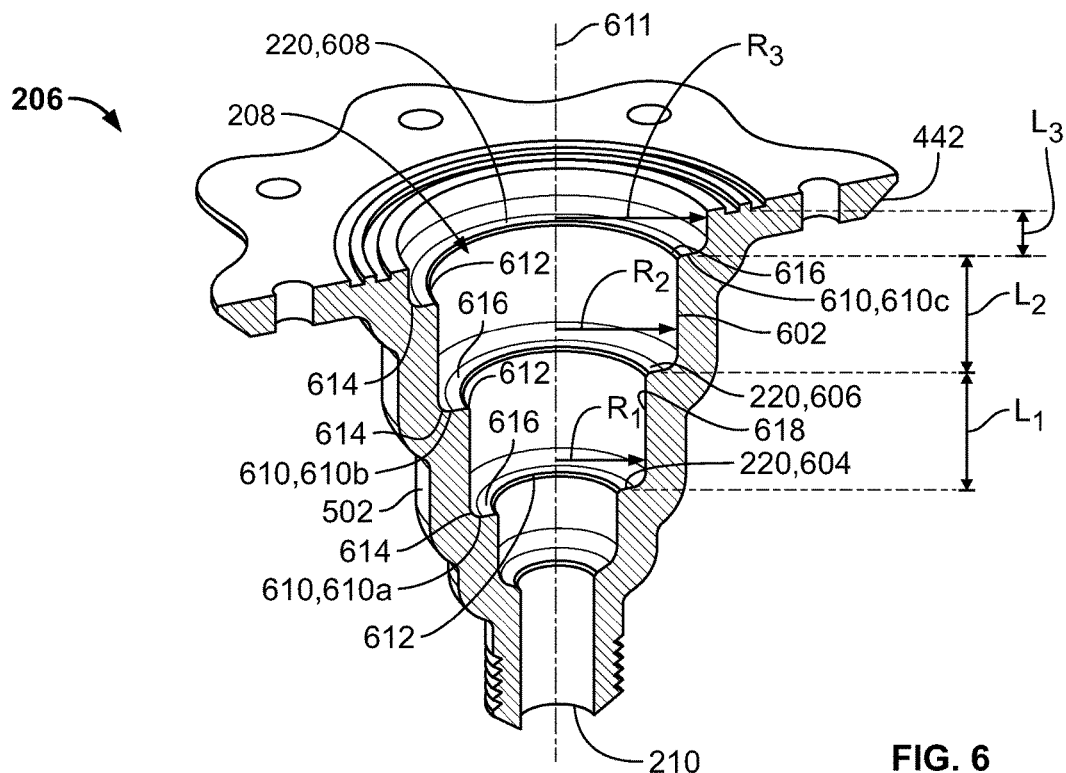
FIG. 6 is a perspective, cross-sectional view of the example second housing of FIG. 5.

FIG. 6 is a cross-sectional, perspective view of the example second housing portion 206 of FIG. 5. The body 502 has an opening 602 defining at least a portion of the fluid flow passageway 208. In addition, the body 502 of the illustrated example defines the valve seats 220. The valve seats 220 of the illustrated example are integrally formed with the body 502. In some examples, the valve seats 220 may be separate parts that can be coupled (e.g., via threads, press-fit, etc.) to the body 502. In the illustrated example, the body 502 includes three valve seats 604, 606, 608 that define respective orifices of the fluid flow passageway 208.

To provide the valve seats 220, the body 502 of the illustrated example includes a plurality of stepped surfaces 610. A first stepped surface 610a has a first dimension (e.g., a first radius $R_1$) relative to a longitudinal axis 611 of the body 502, a second stepped surface 610b has a second dimension (e.g., a second radius $R_2$) relative to the longitudinal axis 611, and a third surface 610c has a third dimension (e.g., a third radius $R_3$) relative to the longitudinal axis 611. In the illustrated example, the first dimension is smaller than the second dimension and the third dimension, and the second dimension is smaller than the third dimension. However, in some examples, the first dimension may be equal to the second dimension and/or the third dimension. In the illustrated example, the first stepped surface 610a or valve seat 604 is spaced from the second stepped surface 610b or valve seat 606 (e.g., in a vertical direction in the orientation of FIG. 6) by a distance $L_1$ and the second stepped surface 610b or valve seat 606 is spaced from the third stepped surface 610c or valve seat 608 by a distance $L_2$ (e.g., a vertical distance in the orientation of FIG. 6). The third stepped surface 610c is spaced from first end 506 (e.g., the flange 504) by a third distance $L_3$. In some examples, the first distance $L_1$ is equal to the second distance $L_2$ and/or the third distance $L_3$. In some examples, the first distance $L_1$ is different from the second distance $L_2$ and/or the third distance $L_3$. In some examples, the second distance $L_2$ is different than the third distance $L_3$.

To reduce stress concentration on the disks 218 and/or to improve sealing capability when the disks 218 engage and/or seal against the valve seats 220, the stepped surfaces 610 may include a curved or arcuate profile 612 (e.g., fillets) and a curved or arcuate transition 614 (e.g., a fillet) between a sealing surface 616 and an inner wall 618 of the body 502. In some examples, the sealing surface 616 has a profile configured to engage (e.g., for matable engagement with) a profile of the disks 218. In some examples, the valve seats 220 may be polished (e.g., to less than 16 micro Ra (arithmetic mean roughness), between approximately 5 micro Ra and 25 micro Ra (arithmetic mean roughness), etc.) to improve sealing. Additionally, the second housing portion 206 (e.g., an inner surface of the second housing portion 206 and/or an outer surface of the second housing portion 206 (e.g., defining the stepped surfaces 610)) may include a radius of curvature or fillet (e.g., a 45 degree fillet) to reduce stress concentrations associated with cyclic loading or vibration.

Figure 7A:
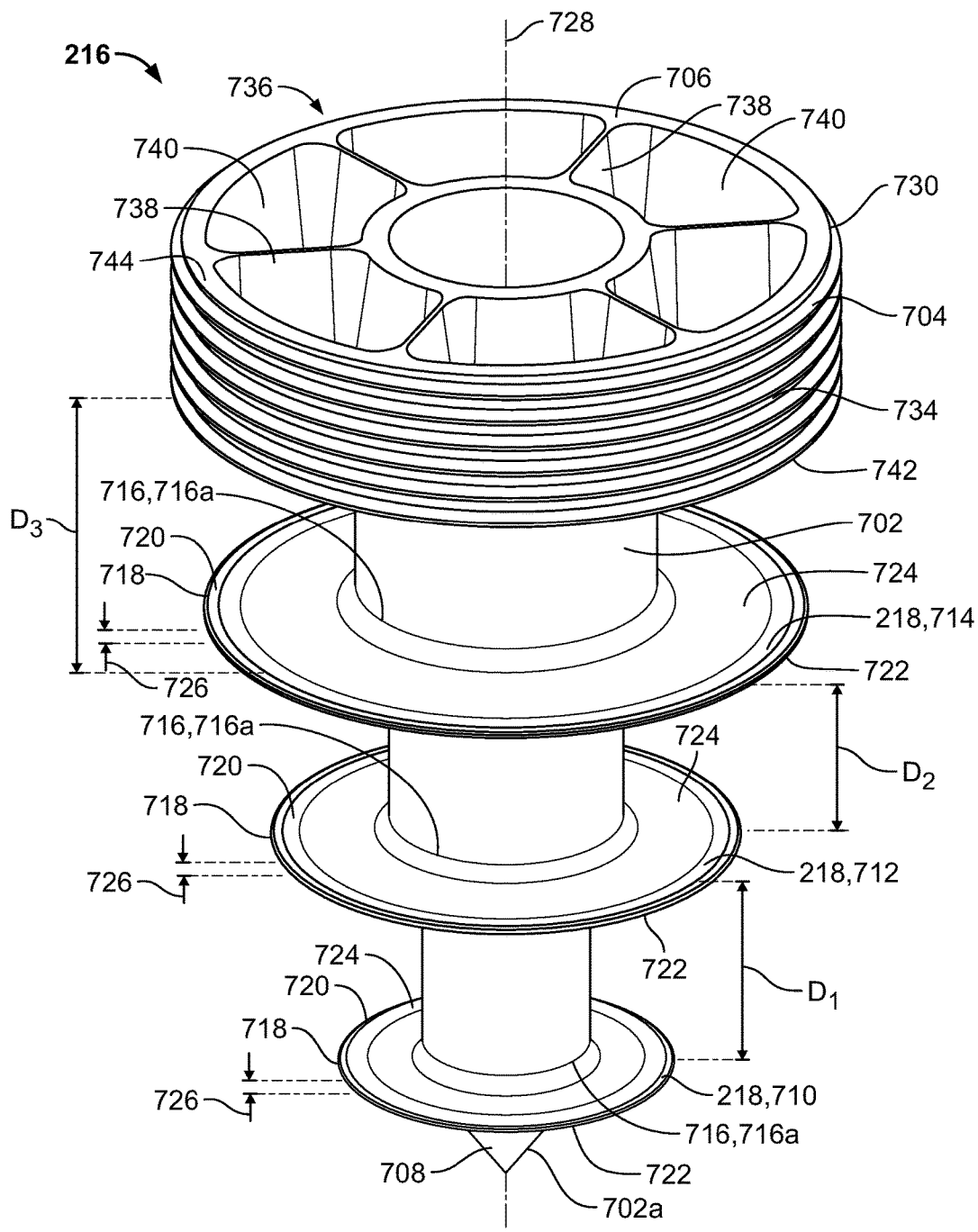
FIG. 7A is a perspective view of an example flow control member of the example fluid apparatus of FIGS. 1 and 2.
Figure 7B:
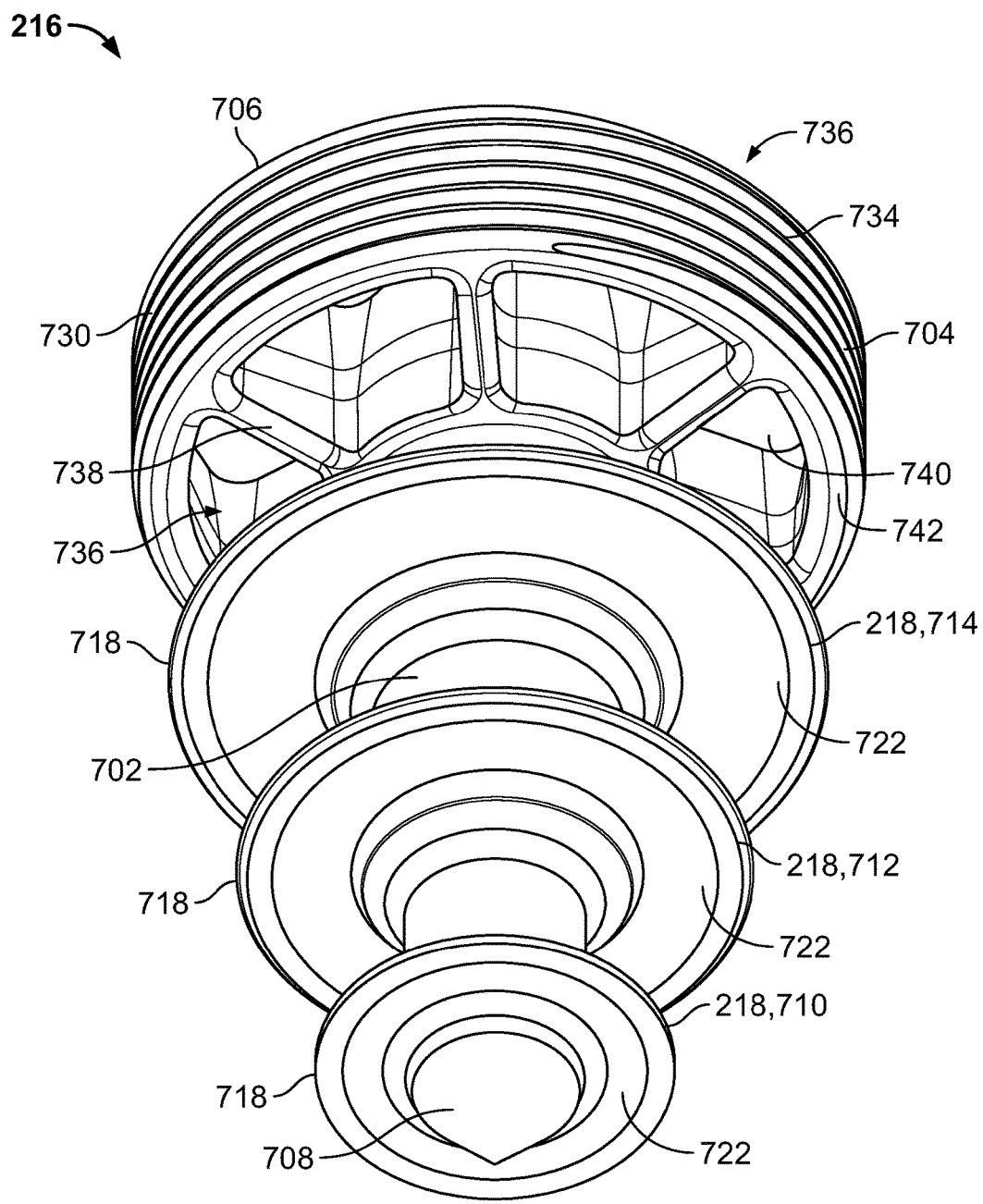
FIG. 7B is another perspective view of an example flow control member of the example fluid apparatus of FIGS. 1, 2, and 7B.

FIGS. 7A and 7B are a perspective view of the example flow control member 216 of FIGS. 1 and 2. The example flow control member 216 of the illustrated example is a poppet having a body or pylon 702, a head 704 and the plurality of disks 218. The pylon 702 of the illustrated example supports the disks 218. The pylon 702 of the illustrated example has a tapered profile between a first end 706 of the pylon 702 adjacent the head 704 and a second end 708 of the pylon 702 opposite the first end 706. For example, a dimension (e.g., a radius) of the pylon 702 varies (e.g., continuously or incrementally decreases) between the first end 706 and the second end 708. However, in some examples, the pylon 702 may include a constant or non-varying diameter between the first end 706 and the second end 708. The second end 708 of the pylon 702 of the illustrated example includes a cone-shaped end that forms a tip 702a (e.g., a point). The second end 708 of the illustrated example has a profile (e.g., a sloped or conical profile) that promotes laminar flow characteristics when a fluid flows across the second end 708 of the flow control member 216.

The flow control member 216 of the illustrated example includes a first disk 710 to engage the first valve seat 604 (FIG. 6), a second disk 712 to engage the second valve seat 606 (FIG. 6), and a third disk 714 to engage the third valve seat 608 (FIG. 6). The first disk 710 of the illustrated example is spaced from the second disk 712 by a first distance $D_1$ and the second disk 712 is spaced from the third disk 714 by a second distance $D_2$. In some examples, the first distance $D_1$ is equal to the second distance $D_2$. In some examples, the first distance $D_1$ is different than the second distance $D_2$. The third disk 714 of the illustrated example is spaced from the head 704 a third distance $D_3$. In some examples, the third distance $D_3$ is equal to the first distance $D_1$ and the second distance $D_2$. In some examples, the third distance $D_3$ is different than (e.g., greater than or less than) the first distance $D_1$ and/or the second distance $D_2$. In some examples, the first distance L1 is different than the first distance D1 and/or the second distance L2 is different than the second distance D2. In this manner, the first disk 710 may be at a different elevation or offset (e.g., above) relative to the first valve seat 604, the second disk 712 may be at a different elevation or offset (e.g., above) relative to the second valve seat 606, and/or the third disk 714 may be at a different elevation or offset (e.g., above) relative to the third valve seat 608.

Each of the disks 218 of the illustrated example has a central opening 716 and a peripheral edge 718. The central opening 716 of each of the disks 218 of the illustrated example receives the pylon 702. In the illustrated example, the central opening 716 defines an inner edge 716a that is attached to the pylon 702. To reduce stress concentrations associated with cyclic loading fatigue (e.g., due to pressurization or vibration), a fillet is provided between the inner edge 716a and the pylon 702. In the illustrated example, the peripheral edge 718 of the illustrated example includes a curve or arcuate shape to provide a curved lip 720 when the disks 218 are in a non-deflected position. In some examples, the curved or arcuate profile of the peripheral edge 718 provides or improves sealing when the disks 218 engage or seal against the respective valve seats 220. In some examples, the curved or arcuate profile of the peripheral edge 718 promotes laminar flow characteristics as fluid flows across or past the disks 218.

Each of the disks 218 of the illustrated example has a first face 722 and a second face 724 opposite the first face 722 separated by a thickness 726 of the disks 218. The first face 722 provides a sealing surface to engage the valve seats 220. In some example, the disks 218 and/or the first faces 722 may be polished (e.g., to less than 16 micro Ra (arithmetic mean roughness), between approximately 5 micro Ra and 25 micro Ra, etc.) to improve sealing between the disks 218 and the valve seats 220. In some examples, the thickness 726 of the disks 218 may affect a cracking pressure of the fluid apparatus 100. For example, the thickness 726 of the disks 218 affects the cracking pressure of the fluid apparatus 100. For example, reducing the thickness 726 of the disks 218 reduces cracking pressure and increasing the thickness 726 of the disks 218 increases cracking pressure. The thickness 726 of each of the disks 218 of the illustrated example is the same. In this manner, the example disks 710-714 provide a gradient or varying cracking pressure. For example, the first disk 710 may have a cracking pressure that is greater than the cracking pressure of the second disk 712 and/or the third disk 714, and the second disk 712 may have a cracking pressure that is greater than the cracking pressure of the third disk 714. However, in some examples, the thickness 726 of the first disk 710 may be different than the thickness 726 of the second disk 712 and/or the third disk 714, and/or the thickness 726 of the second disk 712 may be different than the thickness 726 of the first disk 710 and/or the third disk 714. In some examples, each of the disks 710-714 may have the same cracking pressure. In some examples, the gradient of cracking pressures of the disks 710-714 may be reversed from a lower cracking pressure to a high cracking pressure. For example, the first disk 710 may have a cracking pressure that is less than the cracking pressure of the second disk 712 and/or the third disk 714, and the second disk 712 may have a cracking pressure that is less than the cracking pressure of the third disk 714.

The disks 218 of the illustrated example may have different diameters or radii relative to a longitudinal axis 728 of the pylon 702. For example, the first disk 710 of the illustrated example has a radius that is less than a radius of the second disk 712 and/or the third disk 714, and the second disk 712 has a radius that is less than the radius of the third disk 714. For example, the first disk 710 of the illustrated example includes a radius that is slightly less than the radius $R_1$ of the example first valve seat 604 (FIG. 6), the second disk 712 of the illustrated example includes a radius that is (e.g., slightly) less than the radius $R_2$ of the example second valve seat 606 (FIG. 6), and the third disk 714 of the illustrated example includes a radius that is (e.g., slightly) less than the radius $R_3$ of the example third valve seat 606 (FIG. 6). However, in other examples, each of the disks 218 may have the same radius.

The head 704 of the illustrated example couples the flow control member 216 (e.g., the pylon and the disks 218) to the fluid apparatus 100. In particular, the annular wall 730 of the illustrated example includes an outer surface having threads 734 to engage the threads 406 of the first housing portion 204 (FIGS. 2 and 4). In some examples, the threads 734 of the head 704 are similar to (e.g., the same as) the threads 406 of the first housing portion 204. Additionally, as described in greater detail below, to adjust (e.g., increase or decrease) a pre-load to the disks 218, the flow control member 216 adjusts relative to the longitudinal axis 318 of the first housing portion 204 via the head 704.

To enable fluid flow through the head 704, the head 704 of the illustrated example includes an airfoil 736. More specifically, the airfoil 736 of the illustrated example has a spoke pattern providing a plurality of ribs 738 (e.g., spokes) positioned between a plurality of passageways 740. The ribs 738 and the passageways 740 of the illustrated example are radially spaced relative to the longitudinal axis 728. The passageways 740 and the ribs 738 of the illustrated example extend between a first end 742 of the head 704 and a second end 744 of the head 704 opposite the first end 742. Each of the ribs 738 of the illustrated example separates (e.g., isolates) two adjacent passageways 740. The ribs 738 provide structural support (e.g., rigidity) to the head 704 and, more generally, to the flow control member 216. For example, the ribs 738 prevent the flow control member 216 and/or the pylon 702 from twisting about the longitudinal axis 728 during operation. In the illustrated example, the head 704 is cylindrically shaped and has a diameter that is greater than a diameter of the pylon 702. The head 704 of the illustrated example has a diameter that is larger than the diameter at the first end 706 of the pylon 702. The ribs 738 of the illustrated example attach the annular wall 730 to an outer surface of the pylon 702. To promote laminar flow characteristic(s) through the passageways 740, the ribs 738, the annular wall 730 and a wall of the pylon 702 of the illustrated example employ an airfoil shape having a curved leading edge and a sharp trailing edge as described in greater detail in FIGS. 8A-8E.

Figure 8A:
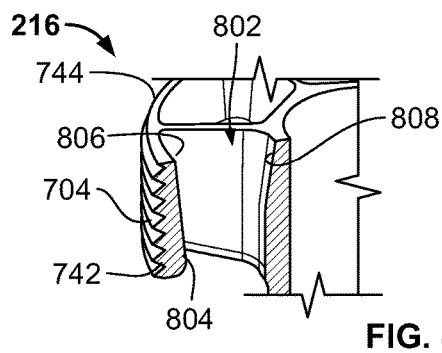
FIG. 8A is an enlarged, cross-sectional view of a portion of the example flow control member of FIGS. 1, 2, 7A and 7B.

FIG. 8A is a cross-sectional view of one of the passageways 740 of the example head 704 of FIGS. 7A and 7B. Each of the passageways 740 of the head 704 of the illustrated example has an airfoil profile 802. More specifically, the airfoil profile 802 of the passageways 740 includes a quarter-chord 804 adjacent the first end 742 of the head 704 (e.g., oriented toward the inlet 210 (FIG. 2)) and a trailing edge 806 adjacent the second end 744 of the head 704 (e.g., oriented toward the outlet 212 (FIG. 2)). In particular, the airfoil profile 802 provides or induces laminar fluid flow characteristic(s) and/or prevents or reduces turbulent fluid flow characteristic(s) as fluid flows through the passageways 740. In other words, the airfoil profile 802 prevents or reduces flow separation from an inner surface 808 of the passageways 740 when fluid flows through each of the passageways 740. In some examples, one or more of the passageways 740 may include a substantially straight flow path (e.g., a passageway without the airfoil profile 802) and/or may include any other shape or profile.

Figure 8B:
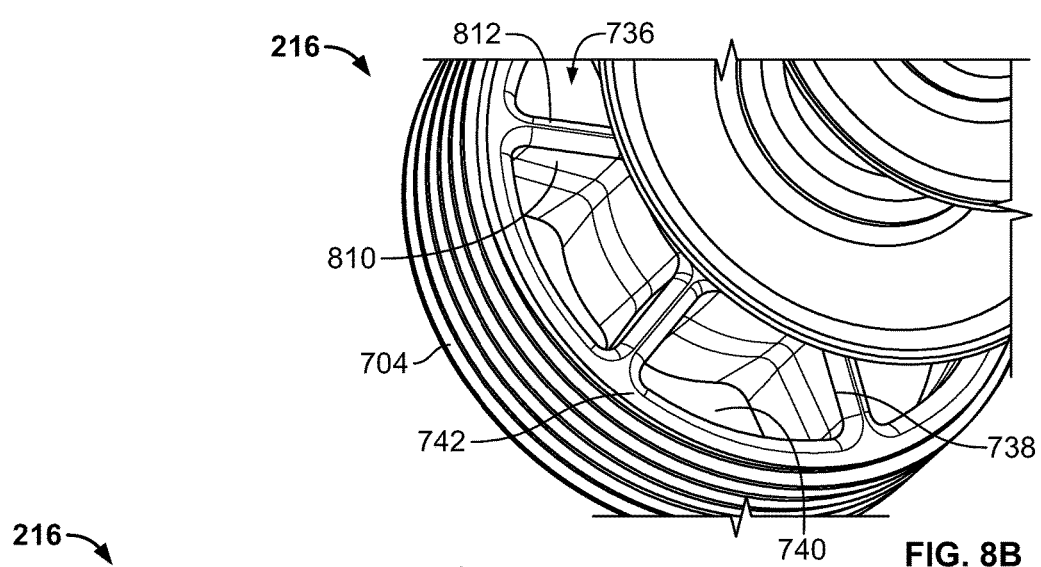
FIGS. 8B and 8C are partial, perspective views of the example flow control member of FIGS. 1, 2, 7A and 7B.
Figure 8C:
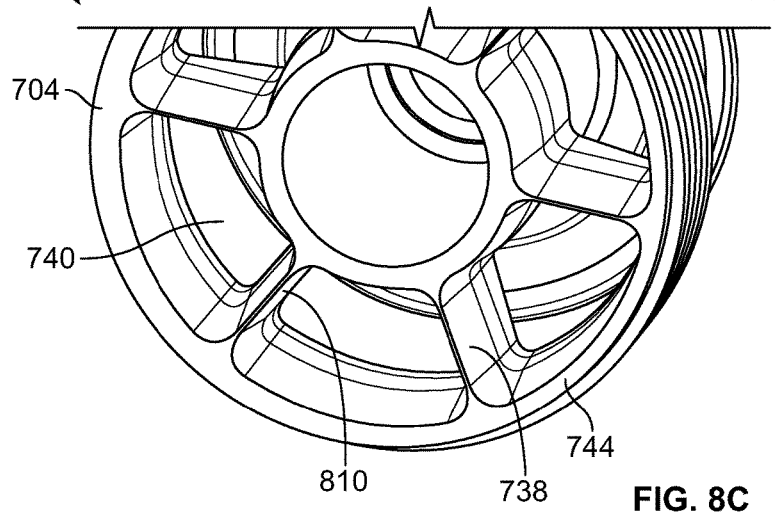
Figure 8D:
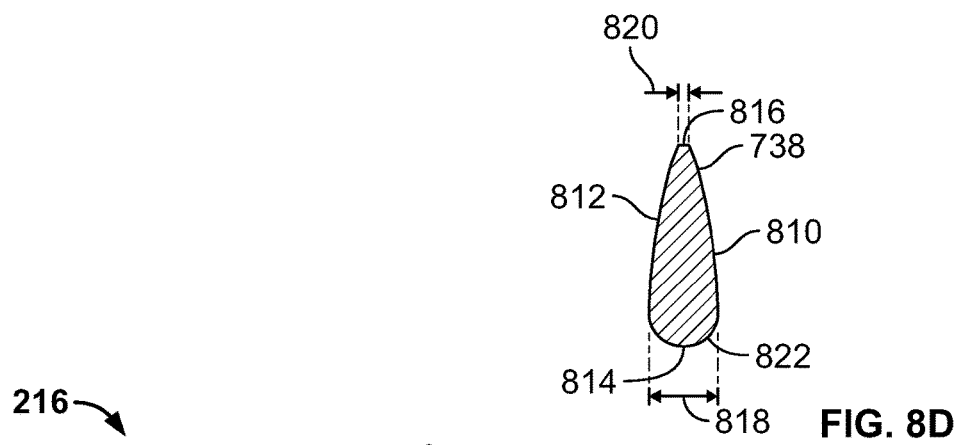
FIG. 8D is a cross-sectional view of a rib of the example flow control member of FIGS. 1, 2, 7A, 7B and 8A-8C.

FIG. 8B is a partial, perspective view of the example flow control member 216 of FIGS. 1-6, 7A, 7B and 8A. FIG. 8C is another partial, perspective view of the example flow control member 216 of FIGS. 1-6, 7A, 7B and 8A. FIG. 8D is a cross-sectional view of one of the ribs 738 of FIGS. 1-6, 7A, 7B and 8A-8C. Referring to FIGS. 8A-8D, each of the example ribs 738 has a body 810. The body 810 of each of the ribs 738 of the illustrated example has an airfoil profile 812 (e.g., a gradually narrowing or tapering profile, an aerodynamic profile, etc.) between a first end 814 of the body 810 and a second end 816 of the body 810. For example, the body 810 of the illustrated example gradually converges toward the second end 816. For example, the first end 814 has a curved leading edge that converges to a sharp trailing edge at the second end 816. The first end 814 of the body 810 is oriented toward the inlet 210 (FIG. 2) and is adjacent the first end 742 of the head 704 and the second end 816 of the body 810 is oriented toward the outlet 212 (FIG. 2) and is adjacent the second end 744 of the head 704. The first end 814 of the body 810 of the illustrated example has a first dimension 818 (e.g., a thickness) that is greater than a second dimension 820 (e.g., a thickness) of the second end 816 of the body 810. In addition, the first end 814 of the body 810 has an arcuate or curved surface or shape 822.

Figure 8E:
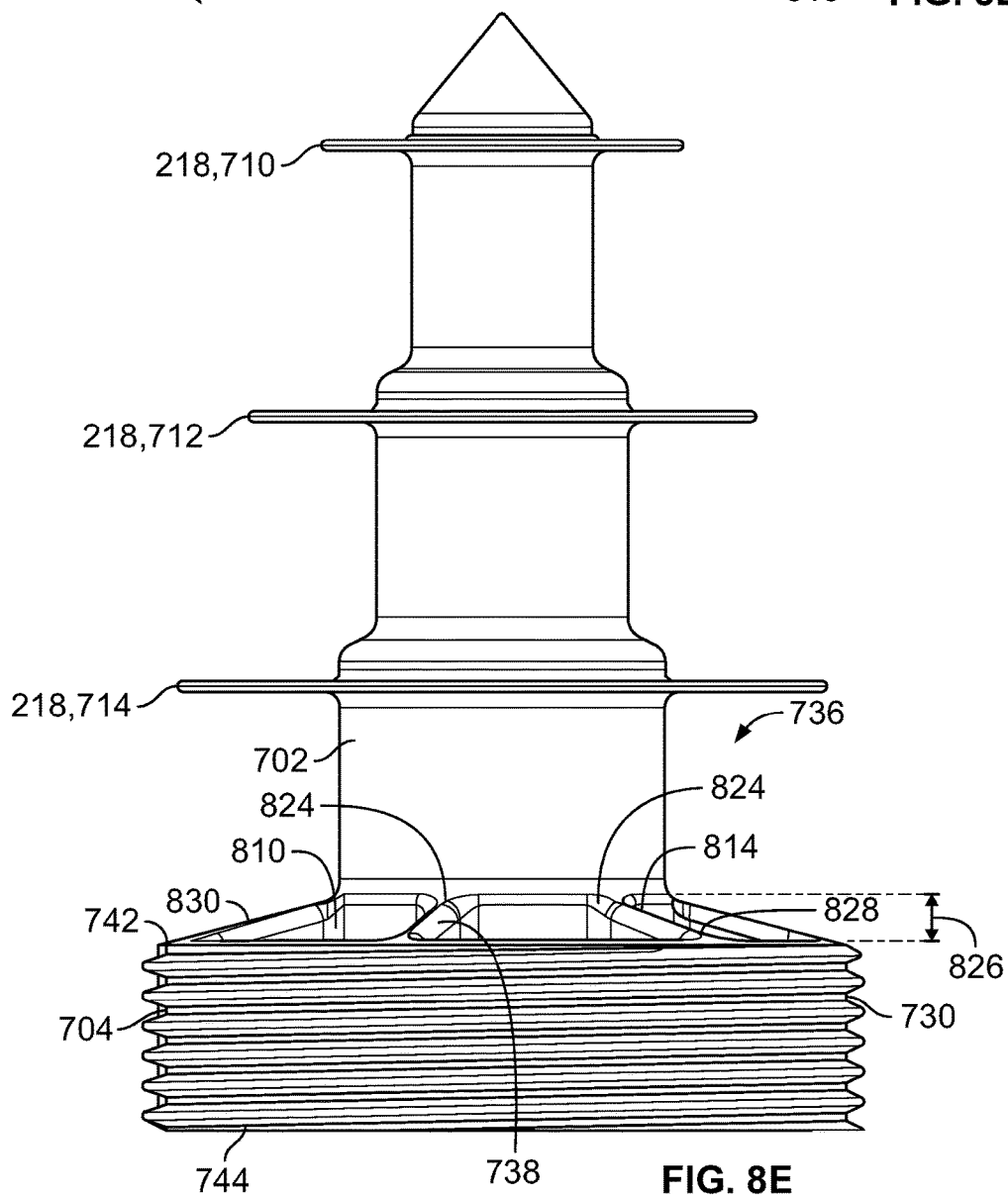
FIG. 8E is a side view of the example flow control member of FIGS. 1, 2, 7A, 7B, and 8A-8D.

FIG. 8E is side view of the example flow control member 216 of FIGS. 1, 2, 7A, 7B and 8A-8C. Referring to FIG. 8E, the first end 814 of the body 810 of each of the rib 738 tapers or is angled between the pylon 702 and the annular wall 730. For example, a first lateral edge 824 of the body 810 adjacent (e.g., coupled to) the pylon 702 is elevated by a distance 826 (e.g., a vertical distance) relative to a second lateral edge 828 of the body 810 adjacent (e.g., coupled to) the annular wall 730. In other words, in the orientation of FIG. 8E, the first lateral edge 824 is above or raised relative to the second lateral edge 828. For example, the first end 814 of the body 810 has a tapered profile 830 between the pylon 702 and the annular wall 730. In the illustrated example, the second lateral edge 828 terminates at the annular wall 730. In some examples, the second lateral edge 828 is substantially flush with the first end 742 of the head 704. Referring to FIGS. 8A-8D, the profile 802 the passageways 740 and/or the profile 812 of the example ribs 738 of the head 704 of the illustrated example promote laminar flow characteristics and/or prevent formation of turbulent flow characteristics when fluid flows across the head 704 via the passageways 740.

Figure 9:
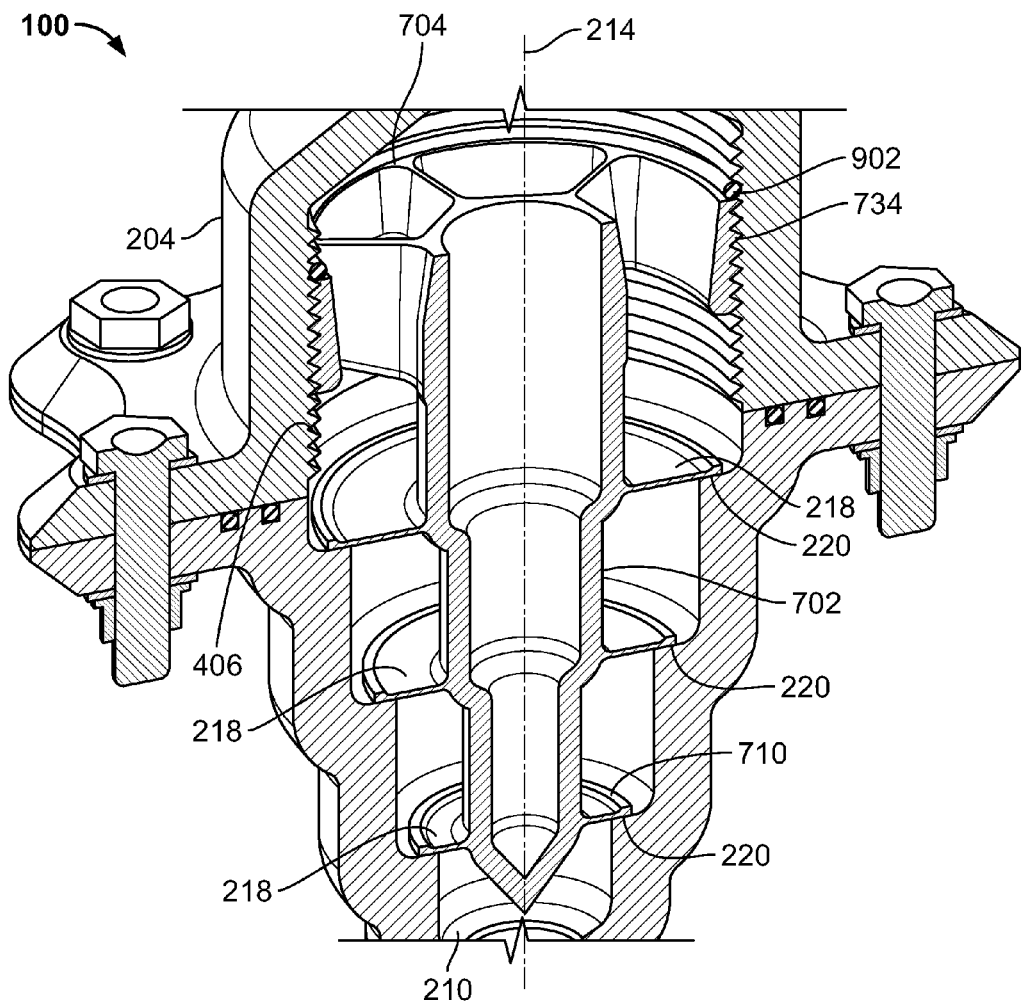
FIG. 9 is another perspective, cross-sectional view of an example fluid apparatus of FIGS. 1-6, 7A-7B, and 8A-8E.

FIG. 9 is another cross-sectional, perspective view of the example fluid apparatus 100 of FIGS. 1-6, 7A-7B, and 8A-8E. To assemble the example fluid apparatus 100, the head 704 of the flow control member 216 is coupled to the first housing portion 204 via threads). The head 704 of the flow control member 216 couples (e.g., fastens) to the first housing portion 204 via the threads 734 of the annular wall 730 and the threads 406 of the first housing portion 204.

To provide and/or adjust (e.g., increase or decrease) a preload on the disks 218, the flow control member 216 of the illustrated example adjusts (e.g., rectilinearly) along the longitudinal axis 214. For example, adjusting a position of the flow control member 216 in a direction along the longitudinal axis 214 adjusts (e.g., increases or decreases) a compression force imparted to the disks 218, which causes the disks 218 to impart a sealing force against the respective valve seats 220. In some examples, the head 704 of the flow control member 216 is rotated about the longitudinal axis 214 and moved to a position corresponding to a desired cracking pressure of the fluid apparatus 100 (e.g., a cracking pressure of the first disk 710). For example, a position of the head 704 closer toward the inlet 210 provides a greater amount of compression force to the disks 218 to enable the disks 218 to seal tighter against the respective valve seats 220 than a position of the head 704 closer toward the outlet 212. In some examples, the first disk 710 of the illustrated example may have the smallest surface area and, thus, the head 704 may be positioned to provide a preload associated with the cracking pressure of the first disk 710. In some examples, due to the threads 734 and the threads 406, the cracking pressures of the disks 218 can be continuously adjusted between an initial threaded position (e.g., provided at a first end of the threads 406) and a final threaded position (e.g., provided at a second end of the threads 406 opposite the first end).

A preload (e.g., the compression force provided to the disks 218) may correspond to a desired cracking pressure (e.g., 90 pounds-per-square-inch (psi)) of the fluid apparatus 100. In the illustrated example, the cracking pressure may be a minimum upstream pressure at the inlet 210 (FIG. 2) that causes the disks 218 to move to an open position (e.g., the disks 218 deflect away from the respective valve seats 220) to allow fluid flow between the inlet 210 and the outlet 212 through the fluid flow passageway 208. Thus, the example fluid apparatus 100 of the illustrated example provides a preload to the flow control member 216 without use of a biasing element such as, for example, a spring. In some examples, a position of the head 704 corresponding to a specific preload may be determined experimentally and/or provided via tables. The experimentally determined preload corresponding to head position may be based on, for example, the thickness 726 of the disks 218, a radius of the disks, a material of the disks, and/or any other factor(s) or characteristic(s). In some such examples, the head 704 may be rotated about the longitudinal axis 214 to position the head 704 at a specific position that provides the desired preload or cracking pressure.

In some examples, after the head 704 is positioned to provide a desired cracking pressure to the disks 218, a fastener 902 may be employed to secure a position of the head 704 along the longitudinal axis 214. For example, the head 704 may be secured to the first housing portion 204 via the fastener 902 to prevent rotation of the head 704 relative to the first housing portion 204 (e.g., the head 704 backing out via the threads 734) due to, for example, vibration imparted to the fluid apparatus 100 during operation. The fastener 902 may include, for example, a weld-tack, a locking ring, a cryo-locktite, a pin, a chemical fastener (e.g., adhesive), C-ring, an S-ring, and/or any other lock or fastener to prevent movement or rotation of the head 704 relative to the first housing portion 204 about the longitudinal axis 214.

After the flow control member 216 is coupled to the first housing portion 204, the second housing portion 206 is coupled to the first housing portion 204. When the second housing portion 206 is coupled to the first housing portion 204, the disks 218 of the flow control member 216 engage the respective valve seats 220. In some examples, each of the disks 218 matably engages the respective one of the valve seats 220. In addition, the surface finishes of the sealing surfaces of the disks 218 and/or the valve seats 220 improve sealing between the disks 218 and the valve seats 220. In the illustrated example, the fasteners 207 couple the first housing portion 204 and the second housing portion 206 via the flanges 308 and 504. In the illustrated example, the holes 316 and 512 of the respective flanges 308 and 504 align to receive the fasteners 207.

In some examples, to trap particulates in a fluid flowing through the fluid apparatus 100, one or more filters may be positioned in the fluid flow passageway 208. In some examples, a filter may positioned adjacent the inlet 210 and/or the outlet 212. The filter may be, for example, a 10-15 micron filter. In some examples, the filter may be formed with the fluid apparatus 100 (e.g., via injection molding, additive manufacturing, etc.). The filter may span the fluid flow passageway 208 (e.g., across a diameter of the fluid flow passageway 208). The filter may capture, for example, particulate contained in a fluid and/or particulate that may flake off the disks 218 (e.g., due to the disks 218 fluttering).

Alternatively, in some examples, the first housing 202 does not include the threads 406. In some such examples, one or more guides or slots are formed in the cavity 402 (e.g., along the inner surface 404) of the first housing 204 and/or the inner surface 618 of the second housing 206. In some such examples, the head 704 and/or the flow control member 216 includes one or more rails to slidably engage a respective guide or slot. In some examples, the rails and/or the slots may include a lock (e.g., protrusions, spring-loaded button and opening, a pin and hole configuration, etc. and/or any other fastener to lock a position of the rails relative to the guides. In some such examples, the lock may be positioned at a plurality of depths or locations (e.g., discrete locations) along the guides and/or the rails. In some such examples, the lock may be positioned at any one of the discrete locations or depths corresponding to a desired preload of the disks 218. In some such examples, the guide and rail configuration provides a snap-in connection or interface between the flow control member 216 and the first housing 204 and/or the second housing 206.

Alternatively, in some examples, the flow control member 218 is threaded to the first housing 204 via the threads 406 a fully threaded position to a fully upward position in the orientation of FIG. 9. In some such examples, the position of the flow control member 216 provides a preload to the disks 218 when the second housing 206 is coupled to the first housing 204. A dimensional length of the body 702 (e.g., along the longitudinal axis 728 between the second end 744 of the head 704 and the tip 708 of the body 702) may be varied during manufacturing to provide different sets of preloads and/or cracking pressures. In some such examples, an array of different sizes of the flow control member 216 may be provided to vary the cracking pressures of the disks 218. For example, the cracking pressures of the disks 218 may be dependent on a length of the flow control member 216.

Figure 10:
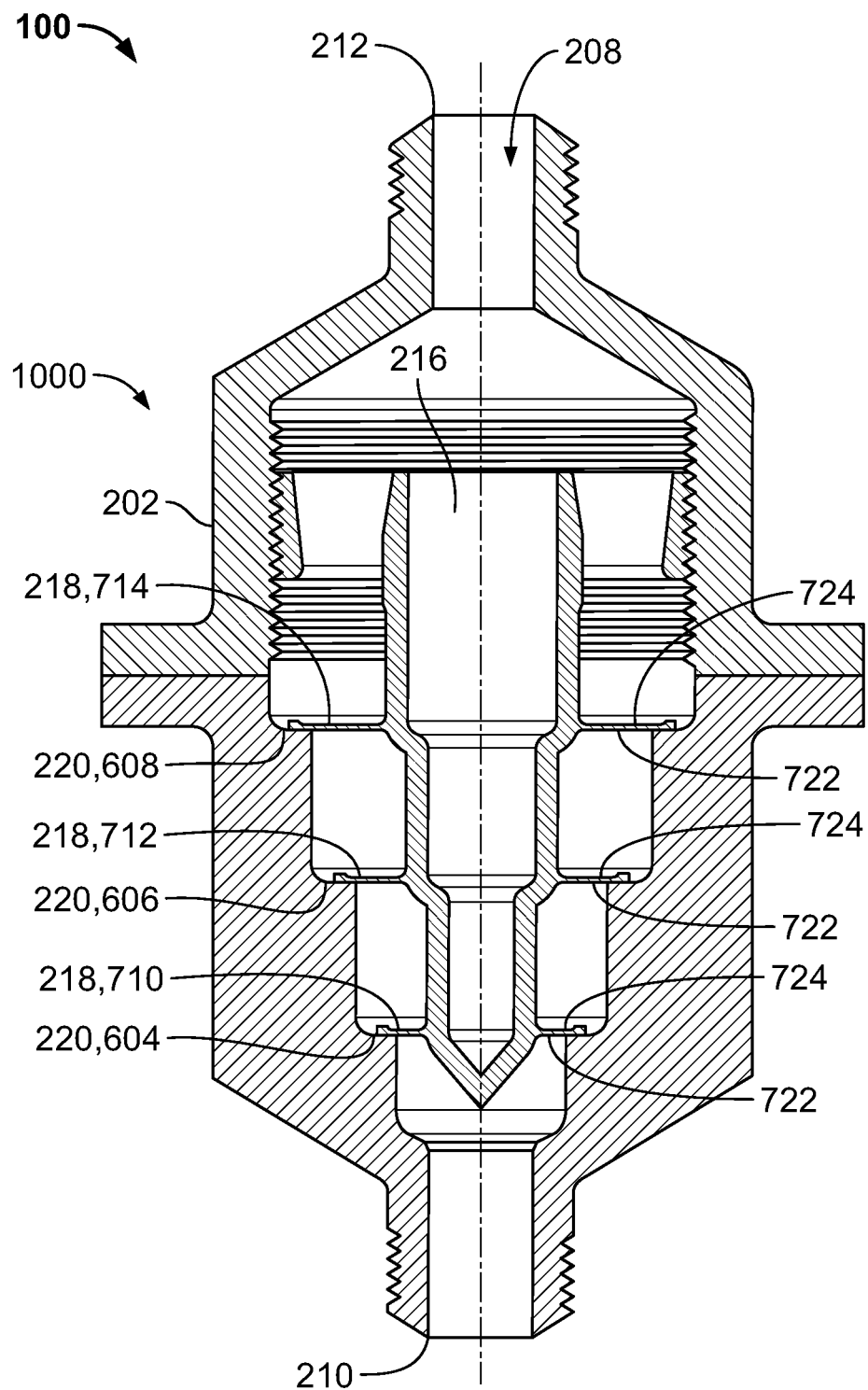
FIG. 10 is a cross-sectional view of the example fluid apparatus of FIGS. 1-6, 7A-7B, 8A-8E and 9 shown in a closed position.

FIG. 10 is a cross-sectional view of the fluid apparatus 100 of FIGS. 1-6, 7A-7B, 8A-8E and 9 shown in a closed position 1000 (e.g., a fully closed position). In operation, when a pressure differential across the disks 218 is less than a cracking pressure of the disks 218, the disks 218 move to the closed position 1000 (e.g., to seal against the respective valve seats 220) to prevent fluid flow through the fluid flow passageway 208 from the inlet 210 to the outlet 212. For example, when a fluid pressure at the inlet 210 is less than a cracking pressure of the disks 218 (e.g., a force or preload imparted to the second end 724 of the disks 218 by the position of the head 704), the first face 722 of the respective disks 218 remain engaged or in sealing engagement with the respective valve seats 220 to prevent fluid flow between the inlet 210 and the outlet 212 via the fluid flow passageway 208. In other words, the disks 218 engage the respective valve seats 220 to provide a tight seal (e.g., a leak proof seal) to prevent fluid from flowing or passing across the valve seats 220 when the fluid apparatus 100 is in the closed position 1000. Additionally, the disks 218, in the closed position 1000, prevent fluid from flowing from the outlet 212 toward the inlet 210 (e.g., reverse fluid flow) when, for example, a fluid pressure at the outlet 212 is greater than a fluid pressure at the inlet 210. In other words, the disks 218 provide a tight seal (e.g., leak proof seal) to prevent reverse fluid flow from the outlet 212 to the inlet 210.

Additionally, the example flow control member 216 provides redundant sealing. In particular, if the first disk 710 fails and allows fluid to flow past the first valve seat 604 when the fluid apparatus 100 is in the closed position 1000, the second disk 712 and/or the third disk 714 remain in sealing engagement with the respective valve seats 606 and 608 when the fluid pressure is less than the cracking pressures of the respective second and third disks 712 and 714, thereby maintaining the fluid apparatus 100 in the closed position 1000.

Figure 11:
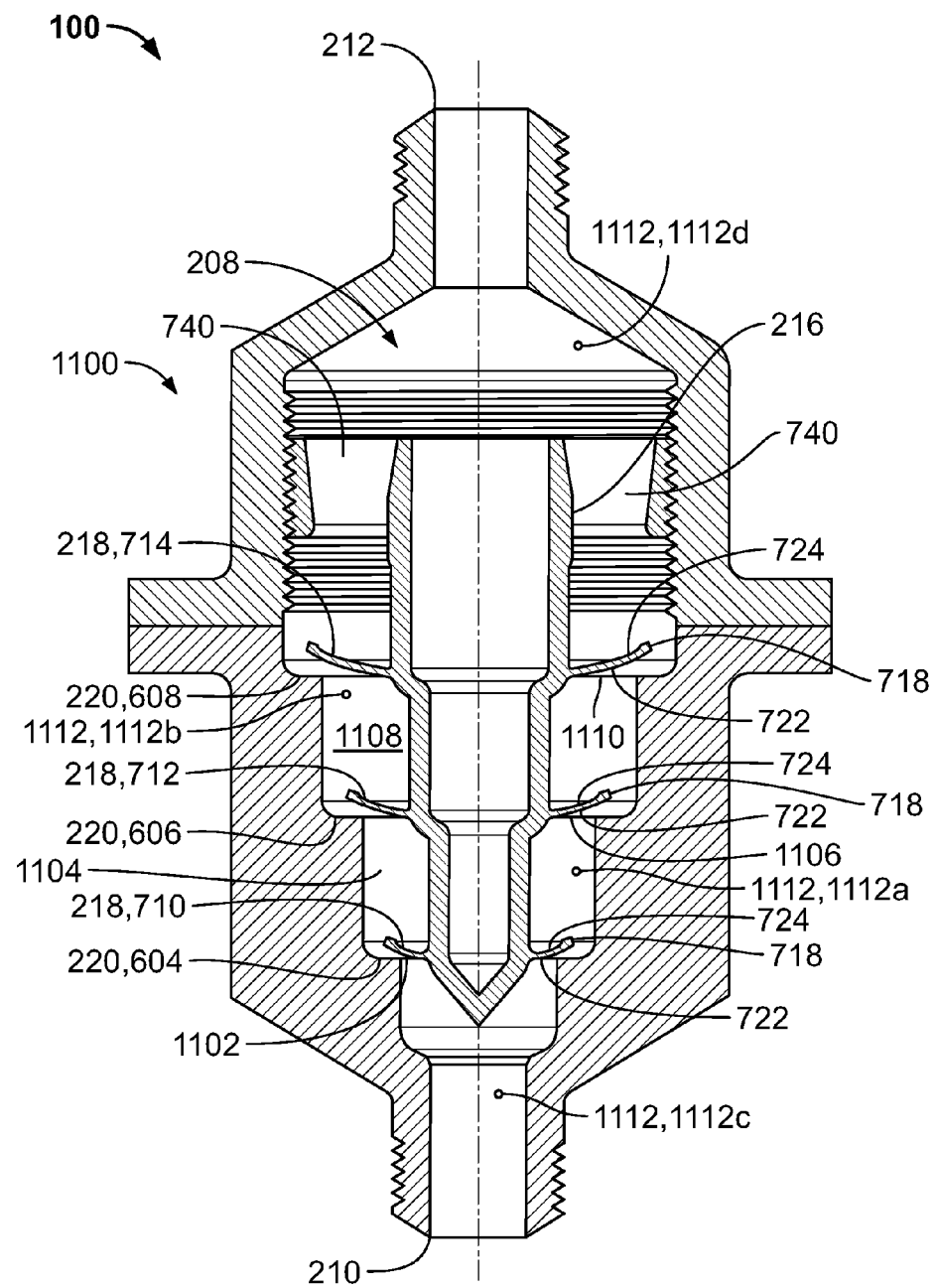
FIG. 11 is a cross-sectional view of the example fluid apparatus of FIGS. 1-6, 7A-7B, 8A-8E, 9 and 10 shown in an open position.

FIG. 11 is a cross-sectional view of the example fluid apparatus 100 shown in an open position 1100 (e.g., a fully open position). In operation, a pressure differential across the disks 218 that is greater than a cracking pressure of the disks 218 causes the disks 218 to move to the open position 1100 (e.g., move or deflect away from the respective valve seats 220) to allow fluid flow through the fluid flow passageway 208 from the inlet 210 to the outlet 212. More specifically, a fluid pressure at the inlet 210 is greater than a cracking pressure of the first disk 710 (e.g., a fluid pressure imparted to the first face 722 of the first disk 710 that is greater than the preload force imparted to the second face 724 by the flow control member 216) causes the peripheral edge 718 of the first disk 710 to deflect away from the first valve seat 604 to allow fluid flow to flow through an orifice 1102 defined by the first valve seat 604. In the illustrated example, the fluid flows to a first chamber 1104 between the first disk 710 and the second disk 712.

When the fluid reaches the second disk 712, a fluid pressure greater than a cracking pressure of the second disk 712 (e.g., a fluid pressure imparted to the first face 722 of the second disk 712 that is greater than the preload force imparted to the second face 724 of the second disk 712 by the flow control member 216) causes the peripheral edge 718 of the second disk 712 to move or deflect away from the second valve seat 606 to allow fluid flow through an orifice 1106 defined by the second valve seat 606. In the illustrated example, the fluid flows from the first chamber 1104 to a second chamber 1108 between the second disk 712 and the third disk 714. Similarly, when the fluid reaches the third disk 714, a fluid pressure greater than a cracking pressure of the third disk 714 (e.g., a fluid pressure imparted to the first face 722 of the third disk 714 that is greater than the preload force imparted to the second face 724 of the third disk 714 by the flow control member 216) causes the peripheral edge 718 of the third disk 714 to move or deflect away from the third valve seat 608 to allow fluid flow through an orifice 1110 defined by the third valve seat 608 and toward the passageways 740 of the head 704. The fluid then flows to the outlet 212.

In the illustrated example, the disks 218 provide a gradually decreasing cracking pressure from the first disk 710 to the third disk 714. Thus, the fluid apparatus 100 moves to the open position 1100 when a fluid pressure is greater than a cracking pressure of the first disk 710. In some examples, the disks 218 may be configured to provide a progressive or gradually increasing cracking pressure from the first disk 710 to the third disk 714. In other words, a fluid pressure may cause the first disk 710 and/or the second disk 712 to move to an open position (e.g., deflect away from the respective valve seats 604 and 606), but the fluid pressure may not cause third disk 714 to move to an open position if the fluid pressure is less than a cracking pressure of the third disk 714.

In some examples, when the cracking pressure of the first disk 710 is greater than the cracking pressures of the second disk 712 and the third disk 714, the disks 218 may not move to their respective open positions simultaneously. In some such instances, when fluid enters the first chamber 1104, a pressure of the fluid may decrease to a pressure below the cracking pressure of the second disk 712. Thus, even if the pressure of the fluid upstream from the first disk 710 is greater than a cracking pressure of the second disk 712, the fluid may not cause the second disk 712 to open when the pressurized fluid enters the first chamber 1104 (e.g., due to hysteresis). The second disk 712 may delay opening to an open position until the pressure of the fluid in the first chamber 1104 increases recovers) to a pressure above the cracking pressure of the second disk 712. Thus, in some instances, the fluid apparatus 100 may provide a lag or delay in opening the second disk 712 and/or the third disk 714. Such delay may be provided, reduced and/or eliminated by adjusting a characteristic of the fluid apparatus 100 such as, for example, the distances (e.g., vertical distances) between the disks 218 (e.g., distances D1, D2 and D3), the distances (e.g., vertical distances) between the valve seats 220 (e.g., distances L2 and L2), the thicknesses of the disks 218, and/or the diameters of the disks 218. In some instances, however, when the cracking pressure of the first disk 710 is greater than the cracking pressures of the second disk 712 and the third disk 714, the disks 218 may move to their respective open positions simultaneously. In some examples, the characteristic such as, for example, the distances (e.g., vertical distances) between the disks 218 (e.g., distances D1 D2 and D3), the distances (e.g., vertical distances) between the valve seats 220 (e.g., distances L2 and L2), the thicknesses of the disks 218, and/or the diameters of the disks 218 can be adjusted or modified to enable simultaneous movement of the disks 218. In some examples, posts or pillars (e.g., pillars 1632 and 1634 of FIG. 16C) may be employed to enable simultaneous movement of the disks 218.

Additionally, when the peripheral edges 718 of the disks 218 deflect or move away from the respective valve seats 220 (e.g., to an open position), the disks 218 have a curved or arcuate profile (e.g., a smooth curve without a kink or sharp edge). In other words, the arcuate profile provides a continuously smooth surface and does not produce or form a fold or kink in the first face 722 of the disks 218 when the peripheral edge 718 is in a deflected or open position (e.g., spaced or deflected away from the valve seats 220). The relatively smooth or arcuate profile of the disks 218 when deflected away from the respective valve seats 220 promotes laminar flow characteristic(s) and/or prevents formation of turbulent flow as the fluid flows across the first face 722 of the respective disks 218. Additionally, the airfoil profile 802 (FIG. 8A) of the passageways 740 and/or the profile 812 of the ribs 738 (FIG. 8D) may promote laminar flow characteristic(s) and/or prevent formation of turbulent flow characteristic(s) as the fluid flows through the passageways 740 and toward the outlet 212.

To monitor a characteristic of a fluid flowing through the passageway 208, the fluid apparatus 100 of the illustrated example employs one or more sensors 1112. For example, the sensors 1112 may monitor or detect a pressure of a fluid, a temperature of a fluid, a velocity of a fluid, and/or any other characteristic of a fluid flowing through the fluid flow passageway 208. The sensors 1112 may be positioned within the fluid flow passageway 208 of the fluid apparatus 100. For example, a first sensor 1112a may be positioned in the first chamber 1104, a second sensor 1112b may be positioned in the second chamber 1108, a third sensor 1112c may be positioned upstream from the first valve seat 604, and/or a fourth sensor 1112d may be positioned downstream from the third valve seat 608. The sensors 1112 may include pressure transducers, a piezoelectric sensor and/or any other suitable sensor(s). The sensors 1112 may be formed with or coupled to an inner surface of the fluid flow passageway 208 via, for example, injection molding, additive manufacturing process(es), fasteners (e.g., chemical or mechanical), and/or any other process(es).

FIGS. 12-16 illustrate other example fluid apparatus 1200-1600 disclosed herein. Those components of the example fluid apparatus 1200-1600 that are substantially similar or identical to the components of the example fluid apparatus 100 described above in connection with FIGS. 1-6, 7A-7B, 8A-8E, and 9-11 and that have functions substantially similar or identical to the functions of those components will not be described in detail again below. Instead, the interested reader is referred to the above corresponding descriptions. To facilitate this process, similar reference numbers will be used for like structures.

Figure 12:
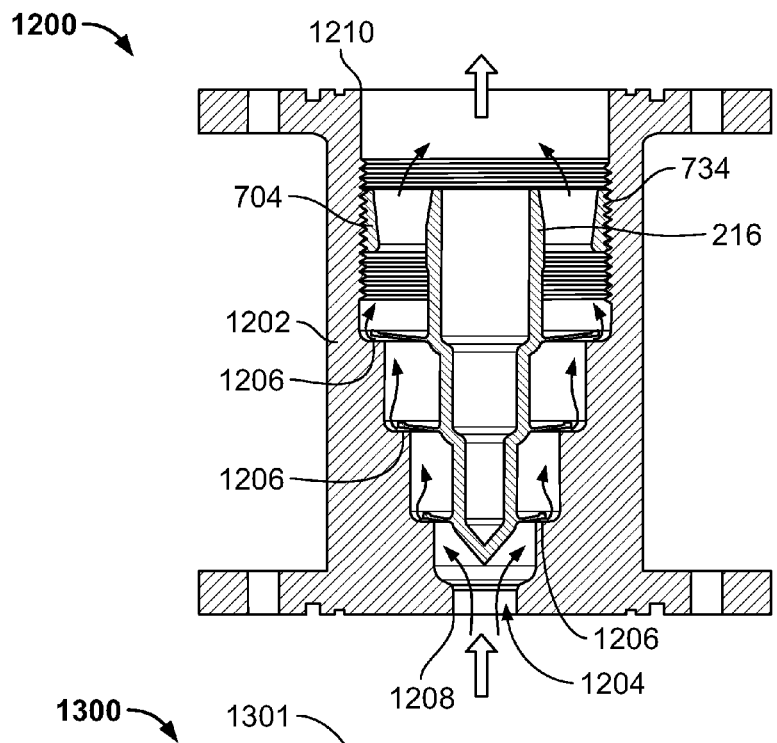
FIG. 12 is a cross-sectional view of another example fluid apparatus disclosed herein.

Referring to FIG. 12, the example fluid apparatus 1200 includes a valve body 1202 defining a fluid flow passageway 1204 having a plurality of valve seats 1206 between an inlet 1208 and an outlet 1210. Unlike the housing 202 of the example fluid apparatus 100 of FIGS. 1-6, 7A-7B, 8A-8E, and 9-11, the valve body 1202 of the example fluid apparatus 1200 is formed as a unitary piece or structure. The flow control member 216 is coupled to the valve body 1202 via the threads 734 of the head 704. For example, the flow control member 216 is positioned in the fluid flow passageway 208 from the outlet 1210 and fastened to the valve body 1202.

Figure 13:
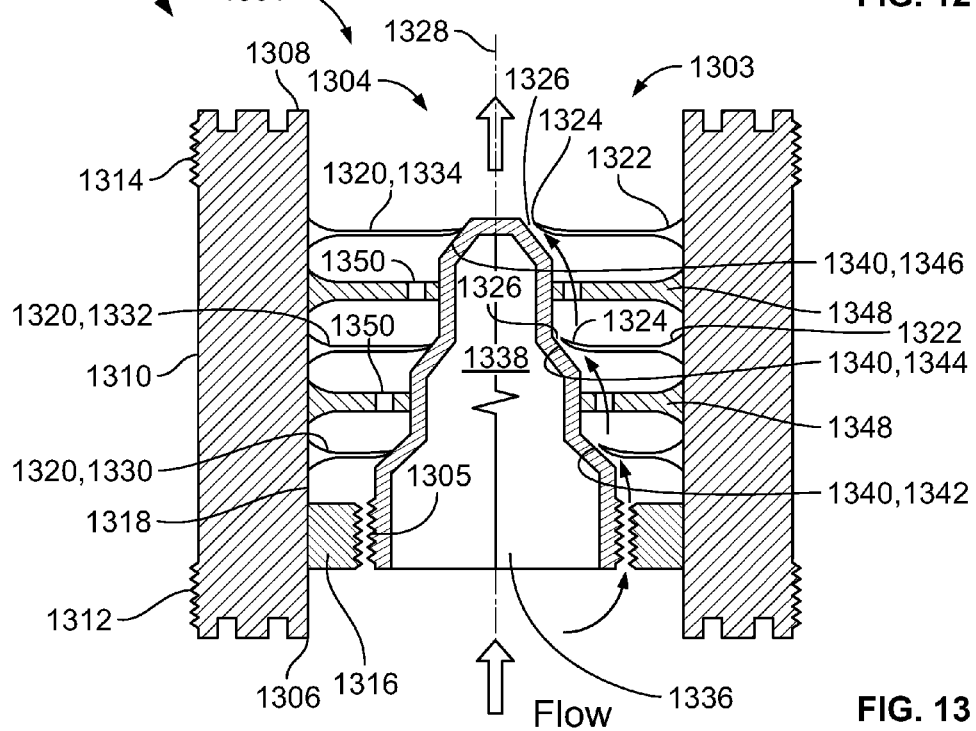
FIG. 13 is a cross-sectional view of another example fluid apparatus disclosed herein.

The example fluid apparatus 1300 of FIG. 13 is shown in a closed position 1301 on the left side of the FIG. 13 and an open position 1303 on the right side of FIG. 13. The fluid apparatus 1300 of the illustrated example includes a valve body 1302 defining a fluid flow passageway 1304 between an inlet 1306 and an outlet 1308. An outer surface 1310 of the valve body 1302 includes a first threaded portion 1312 adjacent the inlet 1306 to couple the fluid apparatus 1300 to an upstream source (e.g., the upstream source 102 of FIG. 1) and a second threaded portion 1314 adjacent the outlet 1308 to couple the fluid apparatus 1300 to a downstream source (e.g., the downstream source 106 of FIG. 1). The valve body 1302 includes a threaded annular wall 1316 projecting from an inner wall 1318 of the fluid flow passageway 1304.

A plurality of disks 1320 are positioned in the fluid flow passageway 1304. In particular, each of the disks 1320 includes an outer peripheral edge 1322 and an inner edge 1324 defined by a center opening 1326. More specifically, the peripheral edge 1322 is fixed or attached to (e.g., integrally formed with) the inner wall 1318 of the valve body 1302 defining the fluid flow passageway 1304 and the inner edge 1324 of the disks 1320 is free to deflect or move. The disks 1320 of the illustrated example project from the inner wall 1318 towards a longitudinal axis 1328 of the valve body 1302. A first disk 1330 has a first dimension (e.g., a diameter), a second disk 1332 has a second dimension a diameter) and a third disk 1334 has a third dimension diameter), where the first dimension is less than the second dimension and the third dimension, and the second dimension is less than the third dimension.

A poppet or flow control member 1336 is coupled to the valve body 1302 and positioned in the fluid flow passageway 1304. To couple to the valve body 1302, the flow control member 1336 of the illustrated example includes a threaded portion 1305 to engage the threaded annular wall 1316. The flow control member 1336 includes a body 1338 positioned through the center opening 1326 of the respective disks 1320. In particular, the body 1338 of the example flow control member 1336 includes a conical or stepped profile to define a plurality of valve seats 1340 to be engaged by a respective one of the disks 1320. For example, the body 1338 of the flow control member 1336 of the illustrated example includes a first valve seat 1342, a second valve seat 1344, and a third valve seat 1346 spaced along the body 1338. The first disk 1330 is to engage or seal against the first valve seat 1342, the second disk 1332 is to engage or seal against the second valve seat 1344, and the third disk 1334 is to engage or seal against the third valve seat 1346 when the fluid apparatus is in a closed position to prevent fluid flow from the inlet 1306 to the outlet 1308.

To support the flow control member 1336 and/or to reduce vibration to the flow control member 1336, the example fluid apparatus 1300 of the illustrated example includes supports 1348. The supports 1348 are coupled to or engage (e.g., frictionally engage) the flow control member 1336 to prevent movement or rotation of the body 1338 relative to the longitudinal axis 1328 due to, for example, vibration. The supports 1348 of the illustrated example include passageways 1350 to enable fluid flow through the supports 1348. In some examples, the passageways 1350 may employ an airfoil profile similar to the passageways 740 of FIGS. 7A and 7B.

In some examples, an example valve disclosed herein may be a hybrid or combination of the poppet of FIG. 12 and the valve body of FIG. 13. For example, a hybrid valve may be configured to provide disks spaced relative to a longitudinal axis of a valve body, where at least a first disk is attached to the valve body and at least a second disk is attached to the poppet. For example, the valve body 1302 of FIG. 13 may be configured with valve seats 1206 to receive the respective disks 218 of the flow control member 216 of FIG. 12, and the flow control member 216 of FIG. 12 may be configured with valve seats 1340 of FIG. 13 to receive the corresponding disks 1320 of the valve body 1302 of FIG. 13. Thus, in some such examples, an example fluid apparatus may have one or more disks (e.g., disks 1320) attached to a valve body that engage valve seats formed by a flow control member, and the fluid apparatus may have one or more disks (e.g., disks 218) attached to the poppet that engage valve seats formed by the valve body.

Figure 14:
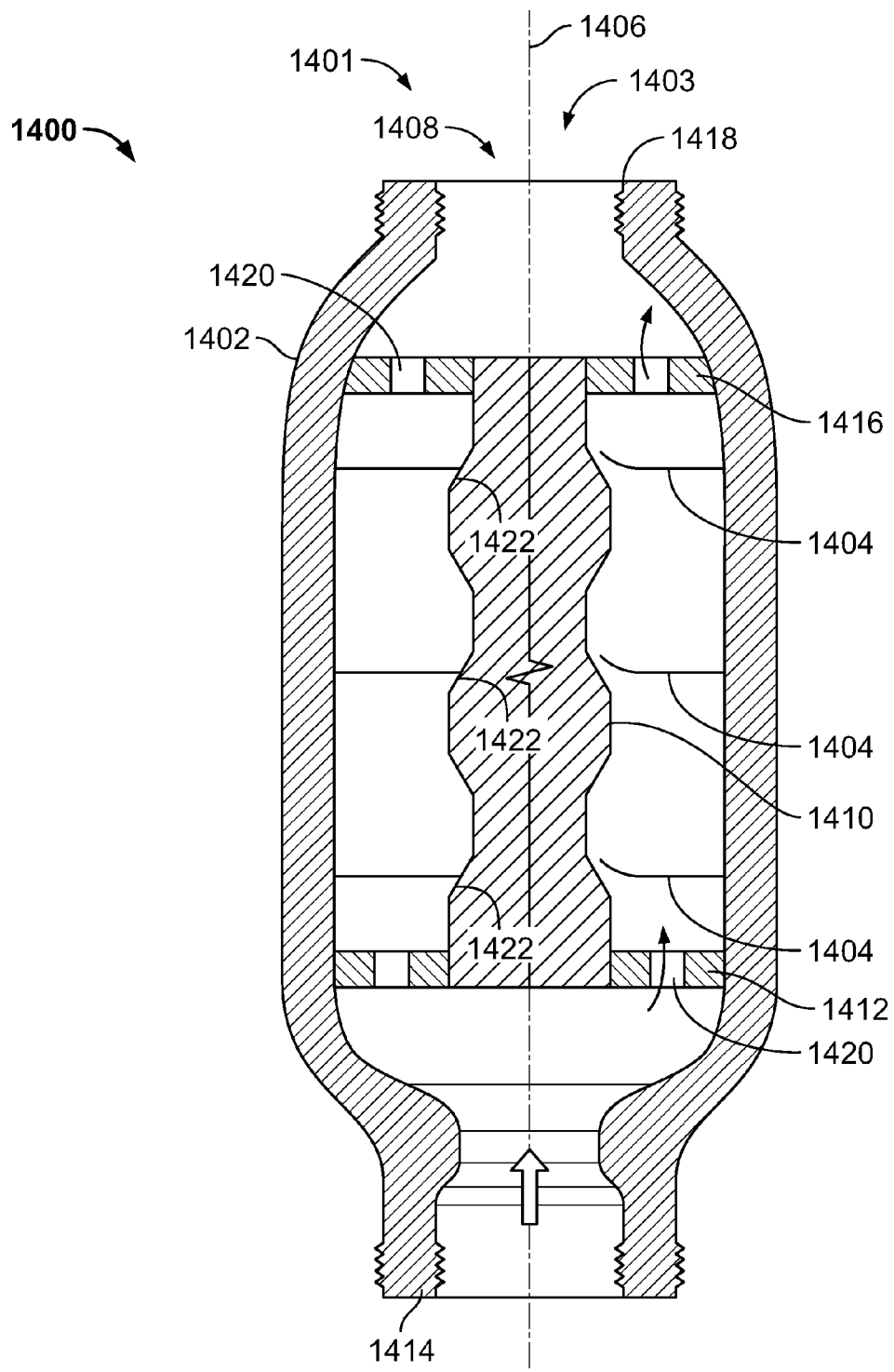
FIG. 14 is a cross-sectional view of another example fluid control apparatus disclosed herein.

Referring to FIG. 14, the example fluid apparatus 1400 is shown in a closed position 1401 on the left side of FIG. 14 and an open position 1403 on the right side of FIG. 14. The fluid apparatus 1400 of the illustrated example includes a valve body 1402 having a plurality of disks 1404 (e.g., radially and longitudinally) spaced relative to a longitudinal axis 1406 of a fluid flow passageway 1408. A flow control member 1410 is supported in the fluid flow passageway 1408 via a first support 1412 adjacent an inlet 1414 and a second support 1416 adjacent an outlet 1418. The first support 1412 and the second support 1416 include passageways 1420 to allow fluid flow through the fluid flow passageway 1408 between the inlet 1414 and the outlet 1418. The flow control member 1410 includes valve seats 1422 to be engaged by the respective disks 1404. In particular, the valve seats 1422 have a varying dimension (e.g., a varying diameter and/or are sloped or angled). In this manner, the disks 1404 seal against the valve seats 1422 when the disks 1404 deflect toward the inlet 1414 to prevent fluid flow through the fluid flow passageway 1408. The disks 1404 deflect away from the valve seats 1422 when the disks 1404 deflect toward the outlet 1418 to allow fluid flow through the fluid flow passageway 1408. Unlike the example fluid apparatus 100, 1200 and 1300 of FIGS. 1-13, the fluid apparatus 1400 of the illustrated example provides a non-adjustable or non-tuning preload to the disks 1404.

Figure 15:
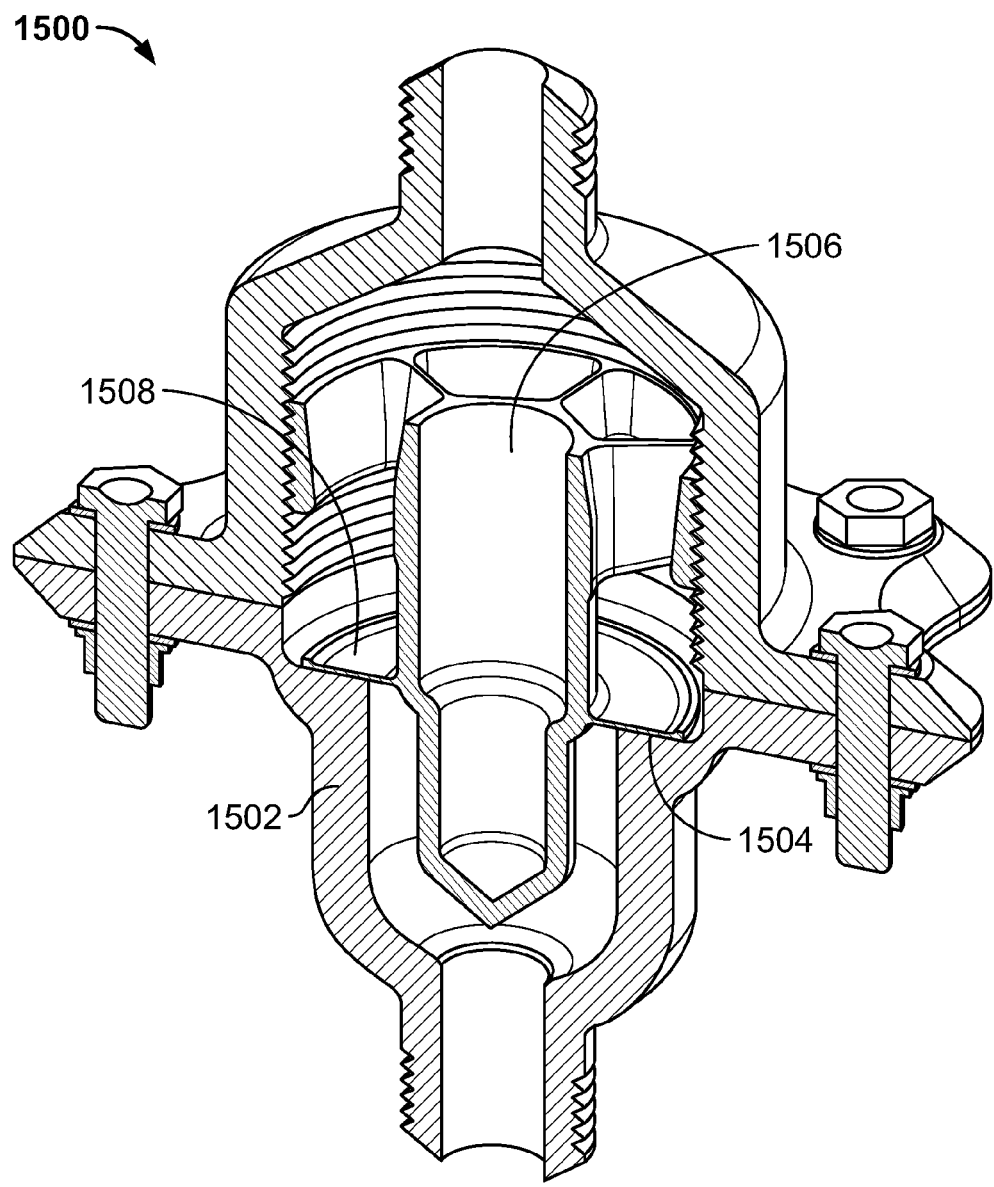
FIG. 15 is a perspective, cross-sectional view of another example fluid apparatus disclosed herein.

Referring to FIG. 15, the example fluid apparatus 1500 is substantially similar to the fluid apparatus 100 of FIGS. 1-11 except the fluid apparatus 1500 does not provide redundant sealing. More specifically, the example fluid apparatus 1500 of the illustrated example includes a valve body 1502 having only one valve seat 1504 and a flow control member 1506 having only one disk 1508.

Figure 16A:
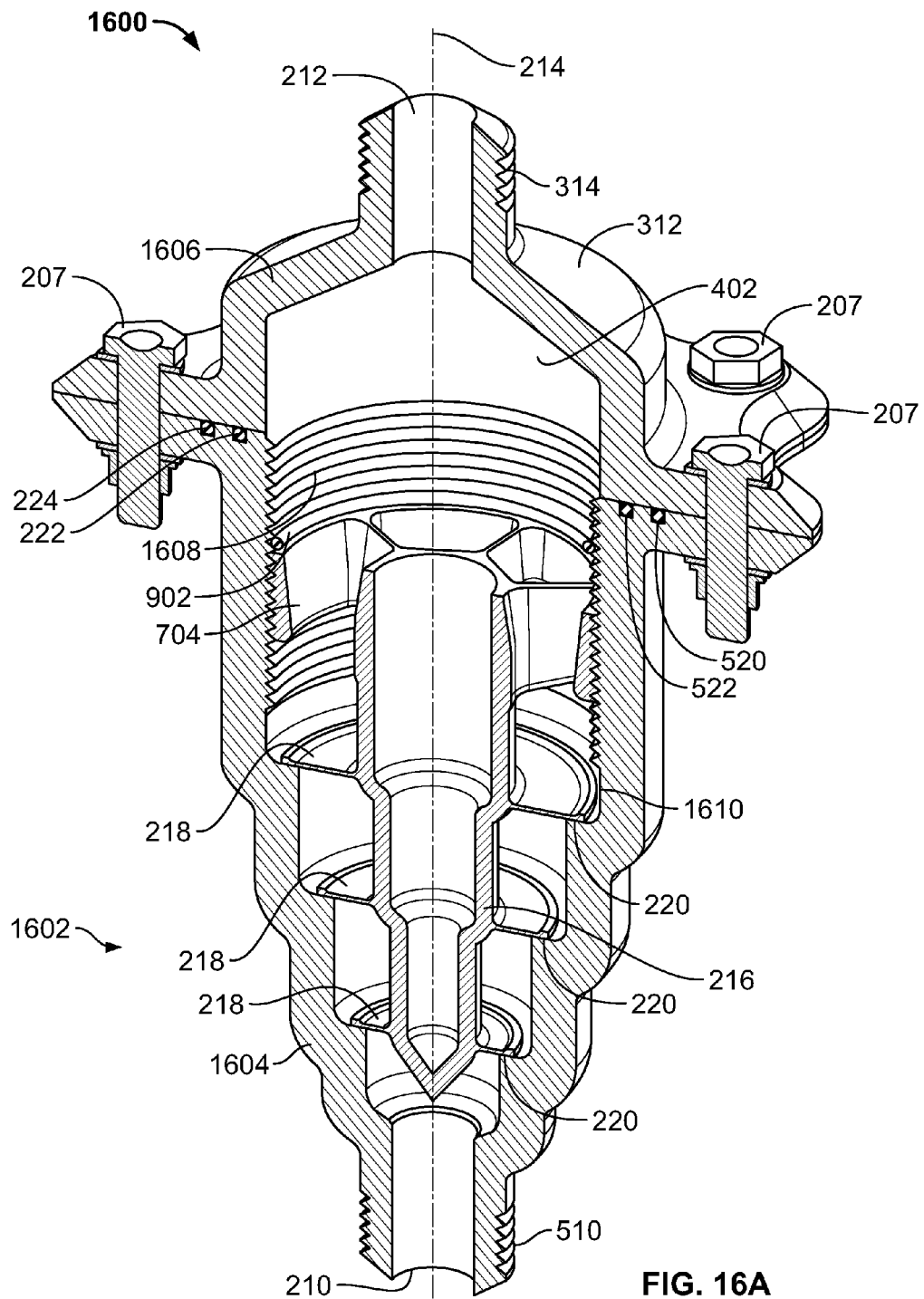
FIG. 16A is a perspective, cross-sectional view of another example fluid apparatus disclosed herein.

Referring to FIG. 16A, the example fluid apparatus 1600 is substantially similar to the fluid apparatus 100 of FIGS. 1-11. The example fluid apparatus 1600 of FIG. 16 includes a housing 1602 having a first housing 1604 (e.g., an upper housing or bonnet) and a second housing 1606 (e.g., a lower housing or valve body). In the illustrated example, the second housing 1606 includes threads 1608 along at least a portion of an inner surface 1610 of the second housing 1606. The threads 1608 are to receive the head 704 of the flow control member 216. In this manner, the flow control member 216 may be positioned or disposed in the second housing 1604 and/or adjusted (e.g., axially adjusted) relative to the second housing 1606 to provide a cracking pressure to the disks 218. Thus, the fluid apparatus 1600 of the illustrated example is similar to the fluid apparatus 100 except that the second housing 1606 includes the threads 1608 and the first housing 1604 does not include threads (e.g., the threads 406 shown in FIG. 4). For example, the second housing 1606 of the illustrated example includes an inlet 210 (e.g., a fitting 508), valve seats 220, a flange 504 and seal glands 520 and 522. The first housing 1604 of the illustrated example includes, for example, a cavity 402, a flange 304, a tapered portion 312, an outlet 212, and a fitting 314. The second housing 1606 of the illustrated example has a length (e.g., an axial length in the direction of the longitudinal axis 214) that is greater than a length of the first housing 1604 (e.g., an axial length in the direction of the longitudinal axis 214). However, in some examples, a length of the first housing 1604 may be greater than or equal to a length of the second housing 1606. The fastener 902 (see FIG. 9) may be provided on the second side of the head 704 to secure a position f the flow control member 216 relative to the second housing 1606 once the flow control member 216 is adjusted to provide a desired cracking pressure. In some examples, the fluid apparatus 1600 of FIG. 16 facilitates placement of the fastener 902 (e.g., a C-ring) to maintain or lock a position of the head 704. In some examples, a spacer may be provided between the respective valve seats between the sealing surface of the valve seats 220 and the disks 218 (e.g., the sealing surface of the disks 218) to prevent or reduce abrasion between (e.g., the sealing surfaces of) the valve seats 220 and the disks 218 when the flow control member 216 rotates relative to the longitudinal axis 214. In some examples, the spacer may be wax or a cloth. After the flow control member 216 is coupled to the second housing 1606, the spacer is removed. For example, the wax may be melted and/or the cloth may be burned after a position of the flow control member 216 is positioned to provide the desired cracking pressures of the disks 218.

Figure 16B:
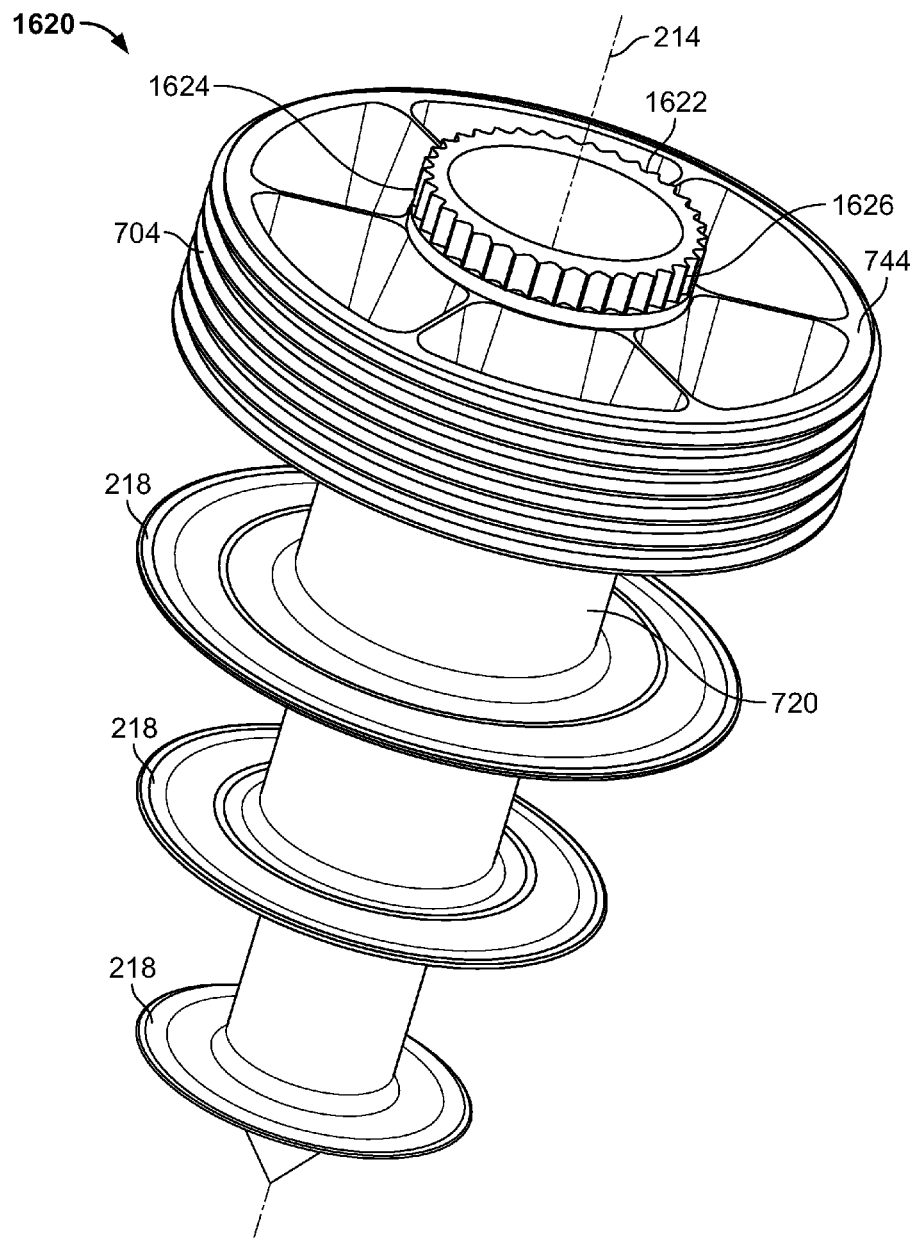
FIG. 16B is a perspective view of another example flow control member disclosed herein that may implement an example fluid apparatus disclosed herein.

FIG. 16B illustrates another example flow control member 1620 disclosed herein that may implement the example fluid apparatus 1600 of FIG. 16A (or any other flow control member of the example fluid apparatus disclosed herein). For example, the flow control member 1620 of FIG. 16B may replace the flow control member 216 of FIG. 16A. The flow control member 1620 is substantially similar to the flow control member 216 of FIGS. 2-6, 7A-7B, 8A-8D and 9-11. For example, the flow control member 1620 includes a pylon 702, a plurality of disks 218 and a head 704. The head 704 of the illustrated example is configured with a tool receiving portion 1622 to receive a tool or other rotating apparatus (e.g., an actuator). The tool receiving portion 1622 of the illustrated example protrudes from an upper surface 1624 of the second end 744 of the head 704 and/or the pylon 702. The tool receiving portion 1622 enables rotation of the head 704 relative to a longitudinal axis 214 (e.g., relative to the second housing 1606). For example, the tool receiving portion 1622 enables rotation of the flow control member 1620 (e.g., via the head 704) to adjust a cracking pressure of the flow control member 216 (e.g., the disks 218). For example, in some instances, a Modulus of Elasticity of the disks 218 may be relatively high such that rotation of the head 704 of one degree relative to the longitudinal axis 214 of the fluid apparatus 1600 may cause a 5-fold increase in the cracking pressure of the disks 218. The tool receiving portion 1622 of the illustrated example enables relatively smaller rotations between approximately 0.01 degree and less than 1 degree) of the head 704 relative to the longitudinal axis 214 to enable fine tune adjustment (e.g., small increments of cracking pressure such as 1 pound-per-square-inch (psi)).

The example tool receiving portion 1622 of the illustrated example has a gear profile 1626 to engage a gear face or profile of a tool to enable fine tune adjustment of the flow control member 216. For example, the gear profile 1626 includes gear teeth radially spaced relative to the longitudinal axis 214. In some examples, the tool receiving portion 1622 and/or the second end 744 of the head 704 and/or the pylon 702 may include a Hex profile, a star profile, and/or any other profile to receive a tool (e.g., a Hex key) to enable rotation of the head 704 relative to the longitudinal axis 214. Thus, the example fluid apparatus 1600 of FIG. 16 may facilitate adjustment of the flow control member 216 to adjust a desired cracking pressure.

In some examples, the fluid apparatus 1600 may employ an actuator to move or rotate the fluid control member 216. For example, the actuator may be a rotary actuator, a linear actuator, an electric motor, a pneumatic actuator, a hydraulic actuator and/or any other device to rotate the flow control member 216 about the longitudinal axis 214. In some examples, the actuator may be positioned inside the fluid flow passageway 208. In some examples, the actuator may be coupled externally relative to the fluid apparatus 100. In some examples, the actuator may be a rotary actuator operatively coupled (e.g., via an actuator stem) to the tool receiving portion 1622. In some examples, an actuator may include a linear actuator to move a rack operatively coupled to the gear profile to rotate of the flow control member 216 relative the longitudinal axis 214. In some examples, the actuator may be an electric motor (e.g., positioned in the fluid flow passageway 208 or outside of the housing 202) that has an output shaft operatively coupled (e.g., directly or indirectly via gears or a transmission) to rotate the flow control member 216. In some such examples, the motor may provide regeneration when a vibration induced rotation causes the flow control member 216 to rotate the motor (e.g., back drive the motor).

Figure 16C:
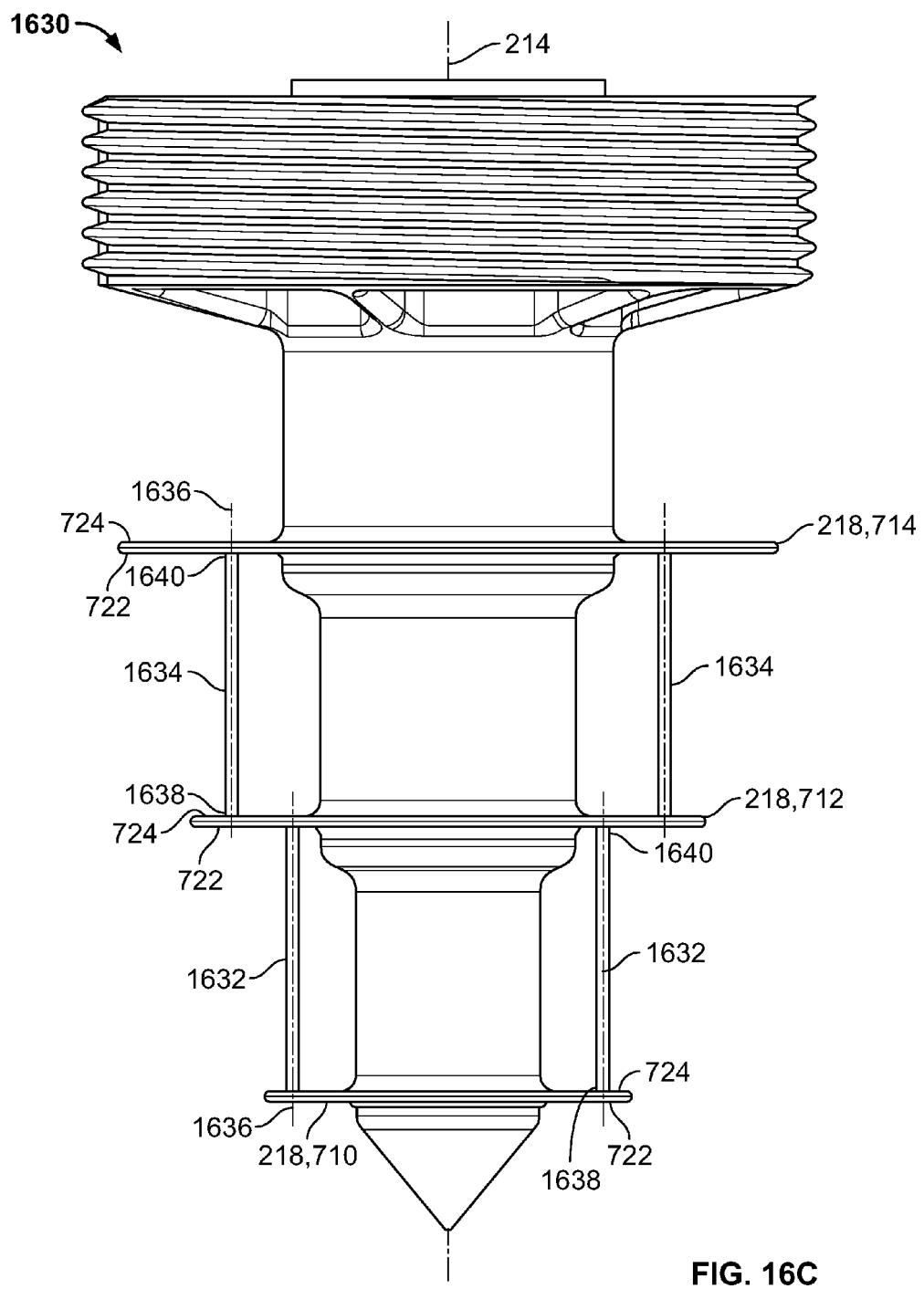
FIG. 16C illustrates another example flow control member disclosed herein that may implement an example fluid apparatus disclosed herein.

FIG. 16C illustrates another example flow control member 1630 disclosed herein that may implement the example fluid apparatus 1600 of FIG. 16A (or any other flow control member of the example fluid apparatus disclosed herein). For example, the flow control member 1630 of FIG. 16C may replace the flow control member 216 of the example fluid apparatus 100 or the example fluid apparatus 1600. The flow control member 1630 is substantially similar to the flow control member 216 of FIGS. 2-6, 7A-7B, 8A-8D and 9-11. For example, the flow control member 1630 includes a pylon 702, a plurality of disks 218 and a head 704. The example flow control member is substantially similar to the flow control member 216 except that it includes legs or pillars 1632 and 1634. The pillars 1632 and 1634 enable simultaneous operation of the disks 218 when the disks 218 move between the open position and the closed position relative to the valve seats 220.

For example, the pillars 1632 of the illustrated example extend between a second side 724 of a first disk 710 and a first side 722 of a second disk 712, and the pillars 1634 of the illustrated example extend between a second side 724 of the second disk 712 and a first side 722 of a third disk 714. In particular, each of the pillars 1632 and 1634 define a longitudinal axis 1636 extending between first end 1638 and a second end 1640. In the illustrated example, the first end 1638 of the pillars 1632 is integrally formed or attached to the second side 724 of the first disk 710 and the second end 1640 is integrally formed or attached to the first side 722 of the second disk 712. Similarly, the first end 1638 of the pillars 1634 is integrally formed or attached with the second side 724 of the second disk 712 and the second end 1640 of the pillars 1634 is integrally formed or attached to the first side 722 of the third disk 714.

The pillars 1632 and 1634 of the illustrated example are radially spaced relative to the longitudinal axis 214. In some examples, the flow control member 1630 may include two pillars 1632 and/or 1634 that are radially spaced relative to the longitudinal axis 214 at an angle of approximately 180 degrees. In some examples, the flow control member 1630 may include three pillars 1632 and/or 1634 that are radially spaced relative to the longitudinal axis 214 at an angle of approximately 120 degrees. In some examples, the flow control member 1630 may include a plurality of pillars 1632 and/1634 that may be radially spaced at an angle of between approximately 30 degrees and 60 degrees relative to the longitudinal axis 214. In some examples, the flow control member 1630 may include only one pillar 1632 and/or 1634.

The longitudinal axis 1636 of the pillars 1632 and/or 1634 of the illustrated example are substantially parallel relative to the longitudinal axis 214. However, in some examples, the pillars 1632 and/or 1634 may be positioned non-parallel (e.g., at an angle greater than zero) relative to the longitudinal axis 214. For example, the longitudinal axis 1636 of the pillars 1632 and/or 1634 may be at a non-parallel angle relative to the longitudinal axis 214. For example, an example angle between the longitudinal axis 1636 of the pillars 1632 and/or 1634 relative to the longitudinal axis 214 may be between approximately 1 degree and 60 degrees.

In operation, the pillars 1632 and 1634 enable simultaneous movement of the first disk 710, the second disk 712 and the third disk 714. In particular, the pillars 1632 and 1634 reduce or eliminate a delay of the first disk 710, the second disk 712 and the third disk 714 moving to their respective open positions due to pressure drops experienced in the chambers 1104 and 1108 noted above in connection with FIG. 11. Thus, the pillars 1632 and 1634 reduce or delay pressure (or flow-rate) change between upstream and downstream sections (e.g., between the chambers 1104 and 1108) of the fluid apparatus 100 by allowing the disks 218 to simultaneously open, as opposed to allowing each chamber 1104 and 1108 to fill with fluid before the third disk 714 moves to an open position.

Thus, when one of the first disk 710, the second disk 712 or the third disk 714 moves to an open position or a closed position relative to the valve seats 220, the other ones of the first disk 710, the second disk 712 or the third disk 714 move simultaneously to their respective open positions or closed positions. For example, when the pressure of the fluid provided at the first side 722 of the first disk 710 is greater than a cracking pressure of the first disk 710, the first disk 710 moves to an open position to allow fluid past the first disk 710. When the first disk 710 moves or deflects to an open position (e.g., an upward position in the orientation of FIG. 16C), the pillars 1632 cause the second disk 712 to deflect or move to an open position, and the pillars 1634 cause the third disk 714 to deflect or move to an open position. Similarly, when the first disk 710 moves to a closed position relative to the valve seat 220, the second disk 712 and the third disk 714 also move to the closed position relative to their respective valve seats 220.

Figure 16D:
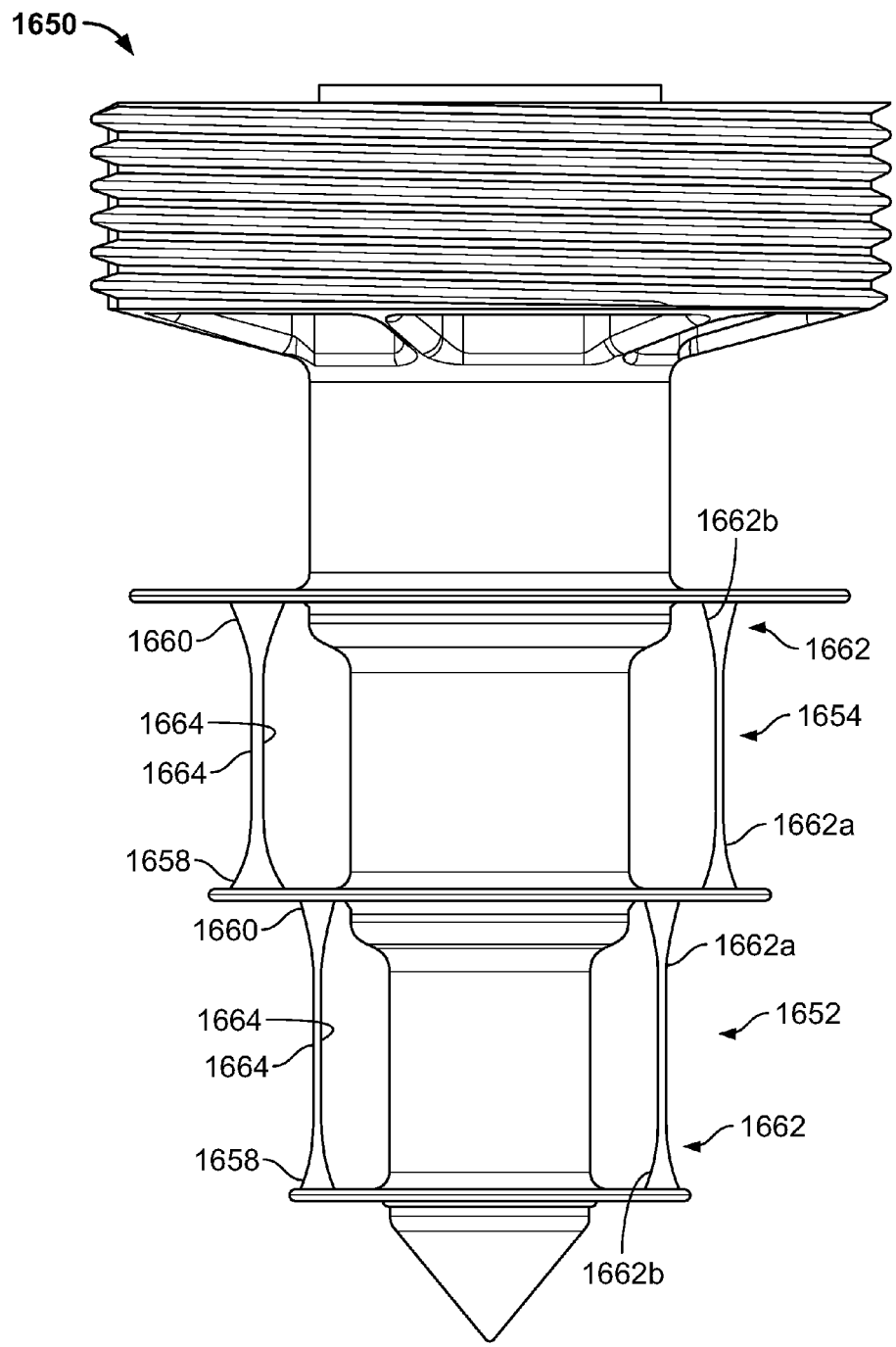
FIG. 16D illustrates another example flow control member disclosed herein that may implement an example fluid apparatus disclosed herein

FIG. 16D illustrates another example flow control member 1650 disclosed herein that may implement the example fluid apparatus 1600 of FIG. 16A (or any other flow control member of the example fluid apparatus disclosed herein). For example, the flow control member 1650 of FIG. 16D may replace the flow control member 216 of the example fluid apparatus 100 or the example fluid apparatus 1600. The flow control member 1650 is substantially similar to the flow control member 1630 of FIG. 16C, but formed with different pillars 1652 and 1654. In particular, the pillars 1652 and 1654 of the illustrated example have a varying flexibility or stiffness characteristic(s). For example, the pillars 1652 and 1654 have a first flexibility or stiffness characteristic and a second flexibility or stiffness characteristic different than the first flexibility or shiftless characteristic. For example, the pillars 1652 and 1654 are relatively flexible when disks 218 are in the closed position (e.g., sealingly engaged with the valve seats 220) and are relatively stiff when the disks crack toward the open position. For example, the pillars 1652 and 1654 increase in stiffness during compression of the pillars 1652 and 1654 such that the disks 218 are more flexible than the pillars 1652 and 1654 when the disks 218 move or deflect toward the open position (e.g., move away from the valve seats 220). As a result, the first flexibility or stiffness characteristic of the example pillars 1652 and 1654 compensate for machining or manufacturing tolerances or errors between the disks 218 (e.g., distances D1, D2 and D3 in FIG. 7A) and the valve seats 220 (e.g., distances L1, L2 and L3 in FIG. 6). In other words, the first flexibility characteristic of the pillars 1652 and 1654 compensate for a small differential in distance offset errors or tolerances between the disks 218 and/or the valve seats 220 (e.g., vertical distances). However, the second flexibility characteristic provides sufficient stiffness during a large offset in distances (e.g., during cracking of the first disk 710) to cause the disks 218 to simultaneously move to their respective open positions relative to the valve seats 220.

To provide varying compression and/or stiffness to the pillars 1652 and 1654, the pillars 1652 and 1654 of the illustrated example are bent, curved or bowed between a first end 1658 and a second end 1660 of the respective pillars 1652 and 1654. More specifically, each of the pillars 1652 and 1654 of the illustrated example include a pair of bows or structures 1662 (e.g., a first bow 1662a and a second bow 1662b having an arcuate profile). As the pair of bows 1662 compress, a center section 1664 of each pair of bows 1662 becomes closer and, ultimately touch, thereby preventing further compression of the pair of bows 1662 and increasing the stiffness of the pillars 1652 and 1654. As a result, the increase in stiffness causes the pillars 1652 and 1654 to exert an upward force, causing the disks 218 to move simultaneously when the first disk 710 moves relative to the valve seat 220.

The pillars 1632 and/or 1634 of the example flow control member 1630, the pillars 1652 and/or 1654 of the example flow control member 1650, and/or the tool receiving portion 1622 of the example flow control member 1620 may be implemented with the other example flow control members 218, 1320, 1404 and 1508 disclosed herein.

Figure 17:
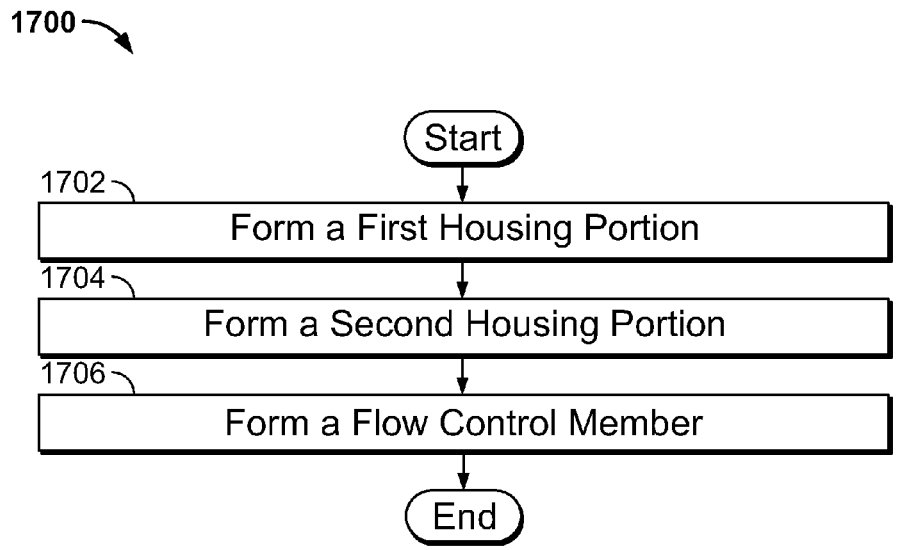
FIG. 17 illustrates an example method to manufacture, fabricate or assemble an example fluid apparatus disclosed herein.
Figure 18:
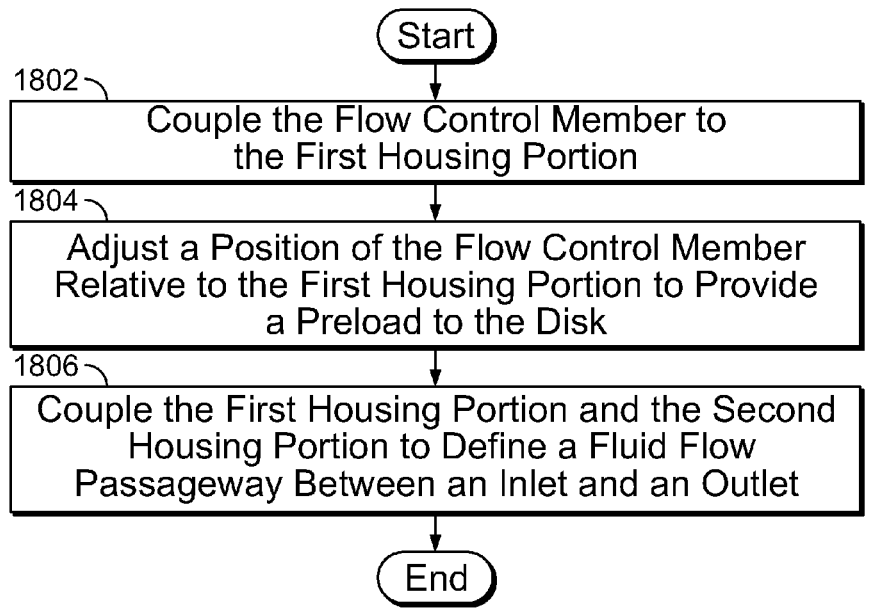
FIG. 18 illustrates an example method to assemble an example fluid apparatus disclosed herein.
Figure 19:
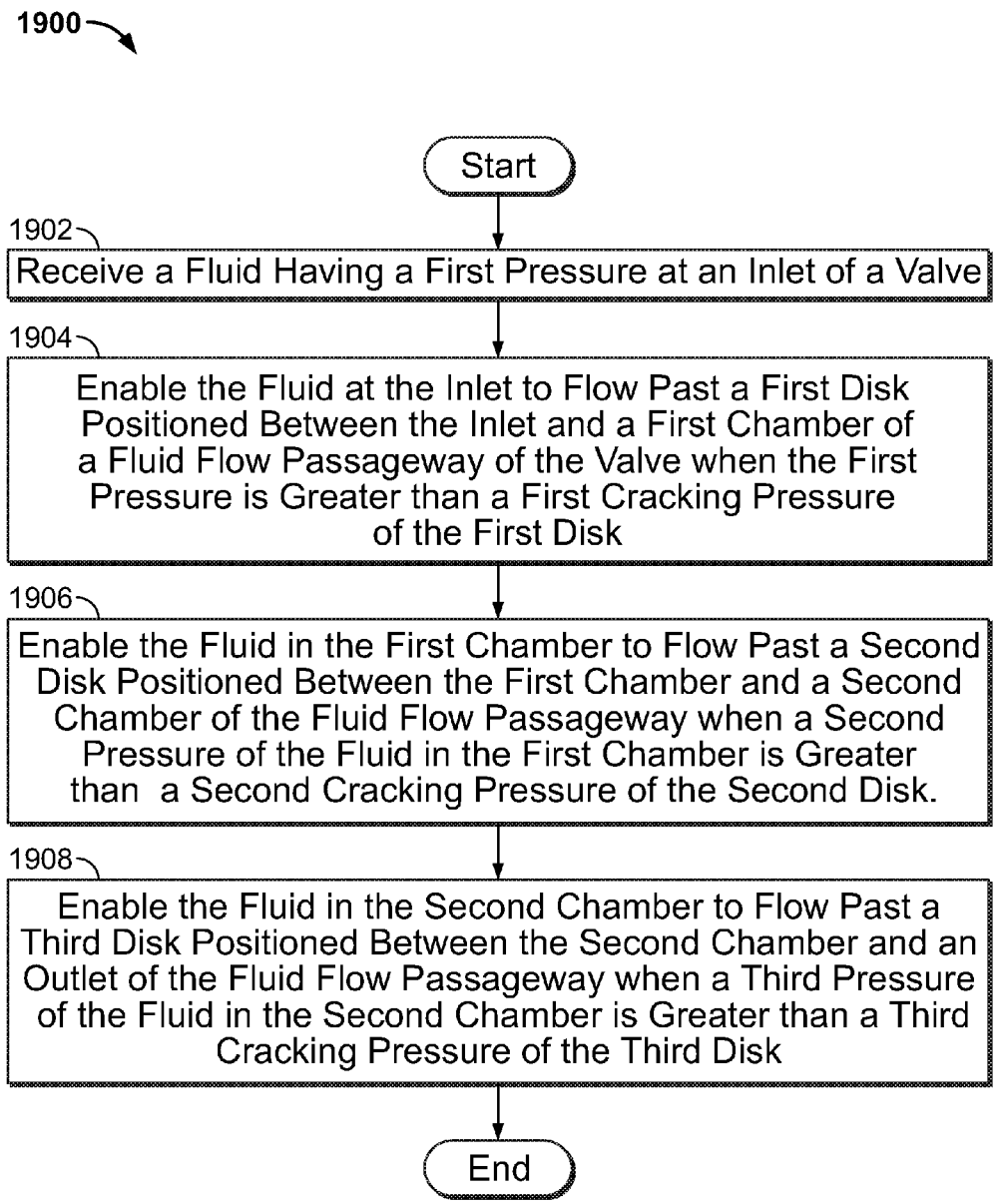
FIG. 19 illustrates an example method of operation an example fluid apparatus disclosed herein.

FIG. 17 illustrates an example method 1700 that may be used to manufacture, fabricate and/or assemble an example fluid apparatus disclosed herein such as the example fluid apparatus 100, 1200, 1300, 1400, 1500 and/or 1600 of FIGS. 1-6, 7A-7B, 8A-8E, and 9-16. FIG. 18 illustrates an example method 1800 that may be used to assemble an example fluid apparatus disclosed herein such as the example fluid apparatus fluid apparatus 100, 1200, 1300, 1400, 1500 and/or 1600 of FIGS. 1-6, 7A-7B, 8A-8E, and 9-16. FIG. 19 illustrates an example method 1900 of operation of an example fluid apparatus disclosed herein such as the example fluid apparatus 100, 1200, 1300, 1400, 1500 and/or 1600 of FIGS. 1-6, 7A-7B, 8A-8E, and 9-16.

While an example of manufacturing, assembling and/or operating the example fluid apparatus 100, 1200, 1300, 1400, 1500 and/or 1600 has been illustrated in FIGS. 17, 18 and 19, one or more of the steps and/or processes illustrated in FIGS. 17, 18 and 19 may be combined, divided, omitted, eliminated, modified and/or implemented in any other way. Further still, the example methods of FIGS. 17, 18 and 9 may include one or more processes and/or steps in addition to, or instead of, those illustrated in FIGS. 17, 18 and 19, and/or may include more than one of any or all of the illustrated processes and/or steps. Further, although the example method is described with reference to the flowcharts illustrated in FIGS. 17, 18 and 19, many other methods of manufacturing, assembling and/or operating the example fluid apparatus 100, 1200, 1300, 1400, 1500 and/or 1600 of FIGS. 1-6, 7A-7B, 8A-8E, and 9-16 may alternatively be used.

Referring to FIG. 17, the example method 1700 disclosed herein may begin by forming a first housing portion (block 1702), forming a second housing portion (block 1704), and forming a flow control member (block 1706). In some examples, the second housing portion may be formed with one or more valve seats. In some examples, the flow control member may be formed with one or more disks. In some examples, the example fluid apparatus 100, 1200, 1300, 1400, 1500 and/or 1600 disclosed herein may be configured with on disk, two disks and/or more than three disks, respectively. In some examples, the example fluid apparatus 100, 1200, 1300, 1400, 1500 and/or 1600 disclosed herein may be manufactured or formed via an additive manufacturing process (e.g., 3D printing), injection molding, machining, and/or any other suitable manufacturing process, and/or any combination thereof. Example additive manufacturing process(es) include, but are not limited to, direct metal laser sintering (DMLS), laser freeform manufacturing technology (LFMT), selective laser inciting (SLIM), fused deposition modeling (FDM), laser puddle deposition (LPD), small puddle deposition (SPD), laser powder bed (LPB), electron beam powder bed (EBPD), indirect power bed (IPD), laser deposition technology (LDT), laser repair technology (LRT), laser cladding technology (LCT), laser deposition welding (LDW), laser deposition welding with integrated milling (LDWM), selective laser sintering (SLS), direct metal printing (DMP), and/or stereolithography (SLA) and/or any combination.

For example, the first housing portion 204, second housing portion 206, the valve body 1202, 1302, 1402, 1502, 1602, the disks 218, 1320, 1404, 1508 and/or the flow control member 216, 1336, 1410, 1506 of the illustrated examples may be manufactured using an additive manufacturing process (e.g., direct metal laser sintering or 3D printing). In some examples, the fluid apparatus 100 may be formed in an assembled state via, for example, additive manufacturing. In some examples, the first housing portion 204, 1604, the second housing portion 206, 1606, and/or the valve body 1202, 1302, 1402, 1502 may be formed via, for example, injection molding and the flow control member 216, 1336, 1410, 1506 may be formed via additive manufacturing process(es), or vice versa. In some examples, the flow control member 216, 1336, 1410, 1506 may be formed with molten Teflonor Kel-F material via injection molding.

In some examples, some or all of the threads (e.g., the threads 406, 734, 1608 the threads of the fittings 314 and 510, etc.) of the example fluid apparatus 100, 1200, 1300, 1400, 1500 and/or 1600 disclosed herein (e.g., the first housing portion 204, 1604 second housing portion 206, 1606, the valve body 1202, 1302, 1402, 1502, the disks 218, 1320, 1404, 1508 and/or the flow control member 216, 1336, 1410, 1506) may be formed via additive manufacturing process(es). In some examples, the threads 406, 734, 1608 and/or the threads of the fluid apparatus 100, 1200, 1300, 1400, 1500 and/or 1600 disclosed herein may be sized as 2.000-12-UNC threading, or a range of course or fine threading sizes. In some examples, the threads 406, 734, 1608 and/or the threads of the fluid apparatus 100, 1200, 1300, 1400, 1500 and/or 1600 may be power screws (e.g., a Joyce worm-gear screw jack). Example power screws are provided by J. K. Nisbett and R. G. Budynas, Shigley's Mechanical Engineering Design, "The Mechanics of Power Screws", chapter 8, section 2, $9^{th}$ edition. In some examples, the threads (e.g., threads 406, 734, 1608, the threads of the fittings 314 and 510) may be formed as a secondary process.

In some examples, after formation of the flow control member 216, 1336, 1410, 1506, the disks 218, 1320, 1404, 1508, and/or the valve seats 220, 1206, 1340, 1422, and 1504, the disks 218, 1320, 1404, 1508 and/or the valve seats 220, 1206, 1340, 1422 and/or 1504 may be polished via a secondary process. For example, a lapping process may be employed on the first side 722 of the disks 218 and/or the valve seats 220, 1206, 1340, 1422 and/or 1504 to allow for localized polishing to improve sealing (e.g., improve sealing classification). Additionally, in some examples, to reduce stress concentrations associated with cyclic loading or vibration, inner and/or outer surfaces of the example the example fluid apparatus 100, 1200, 1300, 1400, 1500 and/or 1600 disclosed herein may include a radius of curvature or fillet (e.g., a 45 degree fillet) to reduce pointed or sharp edges and/or to provide smooth transitions between differently dimensioned portions of the fluid apparatus. For example, inner and/or outer surfaces of the first housing portion 204, the second housing portion 206 (e.g., an inner surface of the second housing portion 206 and/or an outer surface of the second housing portion 206 (e.g., defining the stepped surfaces 610)), and/or the flow control member 216 may include a radius of curvature or fillet (e.g., a 45 degree fillet) to reduce pointed or sharp edges.

Additionally, the components of the example fluid apparatus 100, 1200, 1300, 1400, 1500 and/or 1600 disclosed herein may be formed from the same material or different material(s). For example, the first housing portion 204, 1604, second housing portion 206, 1606, the valve body 1202, 1302, 1402, 1502, the disks 218, 1320, 1404, 1508 and/or the flow control member 216, 1336, 141) 1506 of the illustrated examples may be composed of Inconel 625, metal, aluminum, plastic, Polytetrafluoroethylene (PTFE), stainless steel, an alloy and/or any other suitable material for use in, for example, propulsion systems, cryogenic applications, hydraulic systems, and/or any other material(s) or alloy. In some examples, the first housing portion 204, 1604, second housing portion 206, 1606, the valve body 1202, 1302, 1402, 1502 may be formed of a first material, the disks 218, 1320, 1404, 1508 may be formed of a second material, and/or the flow control member 216, 1336, 1410, 1506 may be formed of a third material. In some examples, the first material is the same as the second material and/or the third material. In some examples, the second material is the same as the third material. In some examples, the first material is different from the second material and/or the third material. In some examples, the second material is different than the first material. In some examples, the disks 218, 1320, 1404, 1508 are formed of different materials. In some examples, the flow control member 216, 1336, 1410, 1506 may be formed (e.g., grown) with a Functionally Graded Materials process (e.g., an FGM process) such that a gradient of coefficient of thermal expansion (CTE) across the flow control member 216, 1336, 1410, 1506 provides varying cracking-pressure gradients across the disks 218, 1320, 1404 (e.g., across the three disks 710, 712, 714) with changes in temperatures, which may be useful for re-entry vehicles, passing multiple some regimes, or space vehicles that are periodically eclipsed from the sun by the earth. In some examples, the disks 218, 1320, 1404 may be formed with material(s) having a coefficient of thermal expansion (e.g., Kel-F) that varies the cracking pressures of the disks 218 (e.g., the first disk 710, the second disk 712 and/or the third disk 714), 1320, 1404, based on a temperature to provide a continuum of cracking pressures during, for example, sonic and/or thermal regimes. For example, materials having a relatively high coefficient of thermal expansion may cause the cracking pressures of the disks 218, 1320, 1404 to vary based on a temperature of a process fluid flowing through the fluid apparatus 100 and/or a temperature of the environment surrounding the valve apparatus 100. In some examples, the disks 218, 1320, 1404 may be composed of material(s) having a low coefficient of thermal expansion such that temperature of the process fluid and/or the environment surrounding the fluid apparatus 100 does not affect the cracking pressures of the disks 218, 1320, 1404. In this manner, the fluid apparatus disclosed herein may provide different performance characteristics during different portions of a flight mission. For example, the cracking pressures of the disks 218 may be a first cracking pressures during an ascent envelope of a mission and a second cracking pressure different than the first cracking pressure during a descent envelope of a mission.

Additionally, the example flow control member 216, 1336, 1410, 1506 disclosed herein may be a unitary piece or structure. However, in some examples, the disks 218 or the disk 1508 may be formed separately from the pylon 702 of the flow control member 216 or 1506. In some examples, the disks 218 or the disk 1508 may be formed from a first material different from a material of the pylon 702. In some examples, the disks 218 or the disk 1508 may be coupled or attached to the pylon 702. For example, the disks 218 or the disk 1508 may attach to the pylon via fasteners (e.g., mechanical fasteners, chemical fasteners), shrink fit and/or any other process(es). In some examples, the example fluid apparatus 1200, 1300, 1400, 1500 and/or 1600 disclosed herein (e.g., the first housing portion 204, 1604, second housing portion 206, 1606, the valve body 1202, 1302, 1402, 1502, the disks 218, 1320, 1404, 1508 and/or the flow control member 216, 1336, 1410, 1506) may be coated (e.g., sprayed) with an anti-tarnishing material(s) to prevent corrosion of the fluid apparatus 1200, 1300, 1400, 1500 and/or 1600 during non-use conditions.

Referring to FIG. 18, the method 1800 of the illustrated example includes coupling the flow control member to the first housing portion (block 1802). For example, referring to FIG. 9, the example flow control member 216 is coupled to the first housing portion 204 or 1604 via the head 704. A position of the flow control member is adjusted relative to the first housing portion to provide a preload to the disks (block 1804). For example, referring to FIG. 9, the head 704 of the flow control member 216 is rotated about the longitudinal axis 214 to a desired position that provides a desired preload to the disks 218. In particular, the threads 734 of the head 704 engage the threads 406 of the first housing portion 204 to enable rectilinear adjustment of the flow control member 216 along the longitudinal axis 214. Once the head 704 or the flow control member 216 is at a desired position, a fastener 902 may be provided to maintain the position of the head 704 or the flow control member 216 relative to the first housing portion 204.

The first housing portion is then coupled to the second housing portion to define a fluid flow passageway between an inlet and an outlet (block 1806). For example, referring to FIG. 9, the first housing portion 204 is coupled to the second housing portion 206 via the respective flanges 308 and 504 and the fasteners 207. In some examples, the first housing portion 204 and the second housing portion 206 of FIGS. 1-6, 7A-7B, 8A-8E, and 9-11, FIG. 15 and/or of FIG. 16 may be formed without the flanges 308 and 504. In some such examples, the first housing portion 204, 1604 may be coupled to the second housing portion 206, 1606 via welding (e.g., linear friction welding, heat welding, fusion), a clamp, rivets, threads, and/or any another fastener (e.g., mechanical fastener, a chemical fastener, etc.). Absent the flanges 308 and 504, the fluid apparatus 100, 1500 and 1600 may provide a relatively smaller footprint. For example, an outermost portion of an outer surface of the first housing portion 204, 1604 may be substantially flush with an outermost portion of an outer surface of the second housing portion 206, 1606 (to provide a cylindrical profile). Referring to FIGS. 12-14, the portion of the method represented by block 1806 may be omitted when manufacturing, forming or assembling the example fluid apparatus 1200-1400.

Referring to FIG. 19, the method 1900 of the illustrated example begins by receiving a fluid having a first pressure at an inlet of a valve (block 1902). For example, a fluid is received at the inlet 210 from the upstream source 102. The method 1900 includes enabling the fluid at the inlet to flow past a first disk positioned between the inlet and a first chamber of a fluid flow passageway when the first pressure is greater than a first cracking pressure of the first disk (block 1904). For example, the fluid at the inlet 210 flows past the first disk 710 to the first chamber 1104. For example, when the fluid at the inlet 210 is greater than a first cracking pressure of the first disk 710, the peripheral edge 718 of the first disk 710 deflects or moves away from the valve seat 604 to allow the fluid to flow to the first chamber 1104. For example, the first chamber 1104 is positioned between the inlet 210 and the second disk 712. In the example shown in FIG. 15, the fluid flows to the outlet 212 after the first disk 710 moves to the open position. In some examples, the fluid flows to the second chamber 1108 when the first disk 710 moves to the open position.

In some examples, fluid in a first chamber is enabled to flow past a second disk positioned between the first chamber and the second chamber of the fluid flow passageway when a second pressure of the fluid in the first chamber is greater than a second cracking pressure of the second disk (block 1906). For example, the fluid in the first chamber 1104 flows past the second disk 712 and to the second chamber 1108 when the pressure of the fluid in the first chamber 1104 is greater than the second cracking pressure of the second disk 712. For example, when the pressure of the fluid in the first chamber 1104 is greater than the cracking pressure of the second disk 712, the peripheral edge 718 of the second disk 712 deflects or moves away from the second valve seat 606 to allow the fluid to flow to the second chamber 1108.

In some examples, the fluid in the second chamber is enabled to flow to an outlet of the fluid flow passageway when a pressure of the fluid in the second chambers greater than a third cracking pressure of a third disk (block 1908). For example, the fluid in the second chamber 1108 flows past the third disk 714 when the pressure of the fluid in the second chamber 1108 is greater than the third cracking pressure of the third disk 714. For example, when the pressure of the fluid in the second chamber 1108 is greater than the cracking pressure of the third disk 714, the peripheral edge 718 of the third disk 714 deflects or moves away from the third valve seat 608 to allow the fluid to flow to the outlet 212.

In some examples, the first cracking pressure of the first disk 710, the second cracking pressure of the second disk 712 and/or the third cracking pressure of the third disk 714 is determined by the position of the flow control member 216 relative to the first housing 202 or the second housing 204. In some examples, the first cracking pressure is different than the second cracking pressure and/or the second cracking pressure is different than the third cracking pressure. In some examples, the first cracking pressure is equal to the second cracking pressure and/or the third cracking pressure.

In some examples, in operation, a vibrational force imparted to the disks 218, 132, 1404, 1508 that is equal to a resonant frequency of the disks 218, 132, 1404, 1508 may cause the disks 218, 132, 1404, 1508 to flake and cause debris to flow downstream. To ensure an aeroelastic, flutter-free design and/or to prevent or reduce flacking of the disks 218, 132, 1404, 1508, the disks 218, 132, 1404, 1508 may be tested after formation of the flow control member 216, 1336, 1410, 1506. For example, the fluid apparatus 100, 1200, 1300, 1400, 1500 and/or 1600 may be tested with conditions or fluid characteristics that the fluid apparatus 100, 1200, 1300, 1400, 1500 and/or 1600 may experience during operation. For example, during testing, the vibrational frequencies of the disks 218, 132, 1404, 1508 may be measured or determined and compared to the resonant frequency of the respective disks 218, 132, 1404, 1508. If the measured frequency is equal to the resonant frequency, a characteristic of the fluid apparatus 100, 1200, 1300, 1400, 1500 and/or 1600 such as, for example, the distances (e.g., vertical distances) between the disks 218, 132, 1404, 1508 (e.g., distances D1, D2 and D3), the distances (e.g., vertical distances) between the valve seats 220, 1340, 1422, 1504 (e.g., distances L2 and L2), the thicknesses of the disks 218, 132, 1404, 1508, and/or the diameters of the disks 218, 132, 1404, 1508, etc., may be adjusted, altered, and/or modified (e.g., redesigned) to alter the resonant frequency of the disks 218, 132, 1404, 1508.

In some examples, a wall thickness of the example fluid apparatus 100, 1200, 1300, 1400, 1500 and/or 1600 disclosed herein (e.g., the first housing portion 204, 1604 the second housing portion 206, 1606 and/or the valve body 1202, 1302, 1402, 1502) may be configured (e.g., dimensionally sized) using the following Soderberg Equations 1-6:

$$\frac{\sigma_a}{S_e} + \frac{\sigma_m}{S_y} = \frac{1}{n} \qquad \text{Eq. 1}$$

$$\sigma_a = \frac{Pd}{2t} \qquad \text{Eq. 2}$$

$$n = 2(\text{safety factor}) \qquad \text{Eq. 3}$$

$$\sigma_m = \sigma_a/2 \qquad \text{Eq. 4}$$

$$\frac{\sigma_a}{2}\left(\frac{2}{S_e} + \frac{1}{S_y}\right) = \frac{1}{n} \qquad \text{Eq. 5}$$

$$t = n(P)\left(\frac{d}{4}\right)\left(\frac{2}{S_e} + \frac{1}{S_y}\right). \qquad \text{Eq. 6}$$

where: $\sigma_a$ is amplitude stress; $S_e$ is endurance limit from Marin Equation; $\sigma_m$ is midrange stress;

$S_y$ is yield strength; n is factor of safety $S_e'$ is test speciment endurance limit;

$S_{ut}$ is ultima strength; where the $k_a$-$k_f$ values are obtained from marine K value equations:

$k_a$ is surface condition modification factor; $k_b$ is size factor; $k_c$ is loading factor;

$k_d$ is temperature factor; $k_e$ is reliability factor;

$k_f$ is miscellaneous effects factor;

and t is thickness.

For example, a wall thickness of the first housing portion 204 and/or the second housing portion 206 of FIGS. 1-11, made from material Inconel 625, configured to have a maximum pressure rating of 100 psi, provides a thickness of 0.4100 inches as follows:

$$S_y = 40 \times 10^3 \text{ psi} \qquad \text{Eq. 7}$$

$$S_e' = 20 \times 10^3 \text{ psi} \qquad \text{Eq. 8}$$

$$S_{ut} = 100 \times 10^3 \text{ psi} \qquad \text{Eq. 9}$$

$$k_a = a(S_{ut})^b = 2.7(100 \times 10^3)^{-0.265} = 0.128 \qquad \text{Eq. 10}$$

$$k_b = 0.91d^{-.157} = 0.732 \qquad \text{Eq. 11}$$

$$k_c = 0.85(\text{axial}) \qquad \text{Eq. 12}$$

$$k_d = 1(cryo) \qquad \text{Eq. 13}$$

$$k_e = 0.620@99.9999\% \text{ Reliability} \qquad \text{Eq. 14}$$

$$k_f = 1 \qquad \text{Eq. 15}$$

$$S_e = S_e'(k_a)(k_b)(k_c)(k_d)(k_e)(k_f) \qquad \text{Eq. 16}$$

$$S_e = (20 \times 10^3)(0.128)(0.732)(0.85)(1)(0.620)(1) = 987.56$$

$$t = 2(100)\left(\frac{4}{4}\right)\left(\frac{1}{987.56} + \frac{2-1}{40 \times 1^3}\right) = 0.4100 \text{ inches}$$

In some examples, the wall thickness of the example fluid apparatus 100, 1200, 1300, 1400, 1500 and/or 1600 disclosed herein (e.g., the first housing 204, 1604 and/or the second housing 206, 1604) may be determined using Finite Element Analysis doublet-lattice solver. In some examples, the wall thickness of the example fluid apparatus 100, 1200, 1300, 1400, 1500 and/or 1600 disclosed herein (e.g., the first housing and/or second housing) may be verified using the following wall-thickness equation:

$$\sigma_a = \frac{P_i R_i^2 - P_0 R_0^2 - \frac{R_i^2 R_o^2 (P_o - P_1)}{R^2}}{R_o^2 - R_j^2};\qquad \text{Eq. 17}$$

where, $\sigma_a$ is largest at $R=R_i$; $P_i$ is an inner pressure; $P_o$ is an outer pressure; $R_i$ is an inner radius (i.e., the radius between the longitudinal axis and the inner surface of the first housing or the second housing), $R_o$ is an outer radius (i.e., the radius between the longitudinal axis and the outer surface of the first housing or the second housing); and R is the location to determine stress.

The fasteners 207 may be tightened in a star pattern to facilitate a seal between the flanges 308 and 504 (e.g., evenly distribute load across a circumference of the seals). In some examples, the fasteners 207 may be pre-loaded with a specific torque. In some examples, safety wires, lock-nuts, Loctite® and/or an other fastener may be employed to ensure pre-loading in the presence of vibration. In some examples, bolt torque pre-loading of the fasteners 207 may be determined with the following equations:

$$T = K \cdot F_i \cdot d \qquad \text{Eq. 18}$$

$$K = 0.2 \qquad \text{Eq. 19}$$

$$F_i = 0.75 \cdot F_p \qquad \text{Eq. 20}$$

$$F_p = A_t \cdot S_p \qquad \text{Eq. 21}$$

$$S_p = 0.85 \cdot S_y \qquad \text{Eq. 22}$$

where, T is torque; $F_i$ is preload; K is torque coefficient; d is major diameter; $F_p$ is proof load; $S_p$ is proof strength, $A_t$ is tensile-stress area; and $S_y$ is yield strength. For example, a major diameter of 0.25 inches, a tensile-stress area of 0.0318, a yield strength of 92 kpsi, a proof strength of 0.85 (92 kpsi), and a torque coefficient of 0.2 would require a torque of 7.77 ft-lb.

$$A\_t = 0.0318$$

$$S\_y = 92 \text{ kpsi}$$

$$F\_p = (0.0318)(0.85)(92 \cdot 10^3)$$

$$F\_i = (0.75)(0.0318)(0,85)(92 \cdot 10^3)$$

$$T = (0.2)(0.75)(0.0318)(0.85)(92 \cdot 10^3)(0.25)(1/12)$$

$$T = 7.77 \text{ ft-lb}$$

Disk deflection of the disks 218, 1320, 1404 and/or 1508 may be determined via Roark's equations. For example, deflection of a disk having an outer free edge and an inner fixed edge may be determined from the flowing equations:

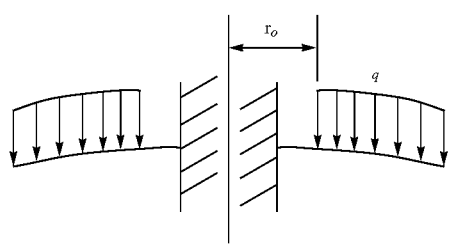

$$M_{rb} = \frac{-qa^2}{C_8}\left[\frac{C_9}{2ab}(a^2 - r_0^2) - L_{17}\right] \qquad \text{Eq. 23}$$

$$Q_b = (a^2 - r_0^2) \qquad \text{Eq. 24}$$

$$y_a = M_{rb}\frac{a^2}{D}C_2 + Q_b\frac{a^3}{D}C_3 - \frac{qa^4}{D}L_{11} \qquad \text{Eq. 25}$$

$$\theta_a = M_{rb}\frac{a}{D}C_5 + Q_b\frac{a^2}{D}C_6 - \frac{qa^3}{D}L_{14} \qquad \text{Eq. 26}$$

$$C_2 = \frac{1}{4}\left[1 - \left(\frac{b}{a}\right)^2\left(1 + 2\ln\frac{a}{b}\right)\right] \qquad \text{Eq. 27}$$

$$C_3 = \frac{b}{4a}\left\{\left[\left(\frac{b}{a}\right)^2 + 1\right]\ln\frac{a}{b} + \left(\frac{b}{a}\right)^2 - 1\right\} \qquad \text{Eq. 28}$$

$$C_8 = \frac{1}{2}\left[1 + v + (1 - v)\left(\frac{b}{a}\right)^2\right] \qquad \text{Eq. 29}$$

$$C_9 = \frac{b}{a}\left\{\frac{1+v}{2}\ln\frac{a}{b} + \frac{1-v}{4}\left[1 - \left(\frac{b}{a}\right)^2\right]\right\} \qquad \text{Eq. 30}$$

$$L_{11} = \frac{1}{64}\left\{1 + 4\left(\frac{r_o}{a}\right)^2 - 5\left(\frac{r_o}{a}\right)^4 - 4\left(\frac{r_o}{a}\right)^2\left[2 + \left(\frac{r_o}{a}\right)^2\right]\ln\frac{a}{r_0}\right\} \qquad \text{Eq. 31}$$

$$L_{17} = \frac{1}{4}\left\{1 - \frac{1-v}{4}\left[1 - \left(\frac{r_o}{a}\right)^4\right] - \left(\frac{r_o}{a}\right)^2\left[1 + (1+v)\ln\frac{a}{r_0}\right]\right\} \qquad \text{Eq. 32}$$

where;

$$y_b = 0$$

$$\theta_b = 0$$

$$M_{ra} = 0$$

$$Q_a = 0$$

and, where the K values are provided from table 1.

TABLE 1

| b/a | 0.1 | 0.3 | 0.5 | 0.7 | 0.9 |
|---|---|---|---|---|---|
| $K_{ya}$ | −0.0757 | −0.0318 | −0.0086 | −0.0011 | |
| $K_{\theta a}$ | −0.0868 | −0.0512 | −0.0207 | −0.0046 | −0.00017 |
| $K_{Mrb}$ | −0.9646 | −0.4103 | −0.1736 | −0.0541 | −0.00530 |

Stress-strain relationship of the disks 218, 1320, 1404 and/or 1508 may be determined via Roark's equations. For example, stress or strain of a disk having an outer free edge and an inner fixed edge may be determined from the flowing equations:

$$\sigma = \frac{6M}{t^2} \qquad \text{Eq. 33}$$

where σ is stress, M is moment, and t is disk thickness. Equation 33, for example, can be used to determine maximum stress on the disks 218, 1320, 1404 and/or 1508 where the disks attach to the pylon 702. The plate constant D can be obtained from the following equation:

$$D = \frac{Et^3}{12(1-v^2)}; \qquad \text{Eq. 34}$$

where D is the plate constant, E is the modulus of elasticity, t is the disk thickness, and v is Poisson's ratio.

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A fluid apparatus comprising:
  a valve body defining a fluid flow passageway and a plurality of valve seats; and
  a flow control member positioned in the fluid flow passageway of the valve body, the flow control member having a plurality of disks, a respective one of the disks to move relative to a respective one of the valve seats to control fluid flow through the valve body, the flow control member being adjustable relative to a longitudinal axis of the valve body to provide a preload to the disks, each of the disks has a cracking pressure corresponding to the preload.

2. The apparatus of claim 1, further including a bonnet to couple to the valve body after the flow control member is positioned in the fluid flow passageway.

3. The apparatus of claim 1, wherein the valve body includes an inner surface defining a threaded wall adjacent the valve seats.

4. The apparatus of claim 3, wherein the flow control member includes a threaded portion to engage the threaded wall of the valve body to enable adjustment of the flow control member relative to the longitudinal axis.

5. The apparatus of claim 1, wherein the flow control member includes a tool receiving interface to enable rotation of the flow control member relative to the valve body.

6. The apparatus of claim 5, wherein the tool receiving interface includes a gear.

7. The apparatus of claim 1, further including a plurality of pillars radially spaced relative to the longitudinal axis and positioned between the disks, the pillars to cause the disks to move simultaneously between an open position and a closed position when a first disk of the plurality of disks moves between the open position and the closed position.

8. The apparatus of claim 1, wherein the valve body includes an inner surface having a plurality of stepped surfaces to define the plurality of valve: seats.

9. An apparatus comprising:
  a valve body defining a valve seat positioned in a fluid flow passageway between an inlet and an outlet and a threaded inner wall; and
  a flow control member positionable in the fluid flow passageway, the flow control member including:
    a body;
    a disk coupled to the body, the disk to seal against the valve seat to prevent fluid flow through the fluid flow passageway when a pressure at the inlet of the valve body is less than a cracking pressure of the disk, and the disk to move away from the valve seat to allow fluid flow through the fluid flow passageway when the pressure at the inlet of the valve body is greater than or equal to the cracking pressure; and
    a head having threaded portion to engage the threaded inner wall of the valve body to couple the flow control member to the valve body, the head being adjustable relative to a longitudinal axis of the valve body to provide a preload to the disk corresponding to the cracking pressure, the head including a plurality of passageways to allow fluid flow between a first side of the head oriented toward the inlet and a second side of the head oriented opposite the inlet.

10. The apparatus of claim 9, further including a bonnet to couple to the valve body, the bonnet having a cavity defining an outlet of the fluid flow passageway.

11. The apparatus of claim 9, wherein the valve seat of the valve body includes a plurality of valve seats spaced along the longitudinal axis the valve body.

12. The apparatus of claim 11, further comprising a plurality of disks, each of the disks to move relative to a respective one of the valve seats to control fluid flow through the valve body.

13. The apparatus of claim 9, wherein the disk includes a center portion coupled to the body and a peripheral edge extending from the center portion to engage the valve seat, the peripheral edge of the disk to move relative to the valve seat to control fluid flow through the fluid flow passageway.

14. An apparatus comprising:
  a valve body defining a valve seat positioned in a fluid flow passageway between an inlet and an outlet and a threaded inner wall; and
  a flow control member positionable in the fluid flow passageway, the flow control member including:
    a body;
    a disk coupled to the body, the disk to seal against the valve seat to prevent fluid flow through the fluid flow passageway when a pressure at the inlet of the valve body is less than a cracking pressure of the disk, and the disk to move away from the valve seat to allow fluid flow through the fluid flow passageway when the pressure at the inlet of the valve body is greater than or equal to the cracking pressure; and
    a head having threaded portion to engage the threaded inner wall of the valve body to couple the flow control member to the valve body, the head being adjustable relative to a longitudinal axis of the valve body to provide a preload to the disk corresponding to the cracking pressure, the head having an annular wall spaced from the body, the annular wall being attached to the body via a plurality of ribs, an outer surface of the annular wall having the threaded portion.

15. A method comprising:
  positioning a flow control member in a first housing of a fluid valve, the first housing having a plurality of valve seats and the flow control member having a plurality of disks, the valve seats and the disks being spaced along a longitudinal axis of the first housing, a respective one of the disks is to engage a respective one of the valve seats when the flow control member is positioned in the first housing; and
  adjusting a position of the flow control member relative to the longitudinal axis to vary a preload of the plurality of disks.

16. The method of claim 15, further including coupling a second housing to the first housing after adjusting the position of the flow control member, the first housing and the second housing to define a fluid flow passageway between an inlet and an outlet of the fluid valve.

17. The method of claim 15, wherein the adjusting the position of the flow control member includes rotating the flow control member about the longitudinal axis.

18. The method of claim 17, wherein adjusting the position of the flow control member includes threadably coupling a head of the flow control member to an inner surface of the first housing.

19. The method of claim 18, further including providing a fastener adjacent threads of the head and threads of the inner surface of the first housing to secure a position of the flow control member along the longitudinal axis.

* * * * *